Dec. 2, 1941.  W. C. PALMER ET AL  2,264,768
METHOD AND APPARATUS FOR CONVEYING ARTICLES
Filed Feb. 28, 1939  9 Sheets-Sheet 7
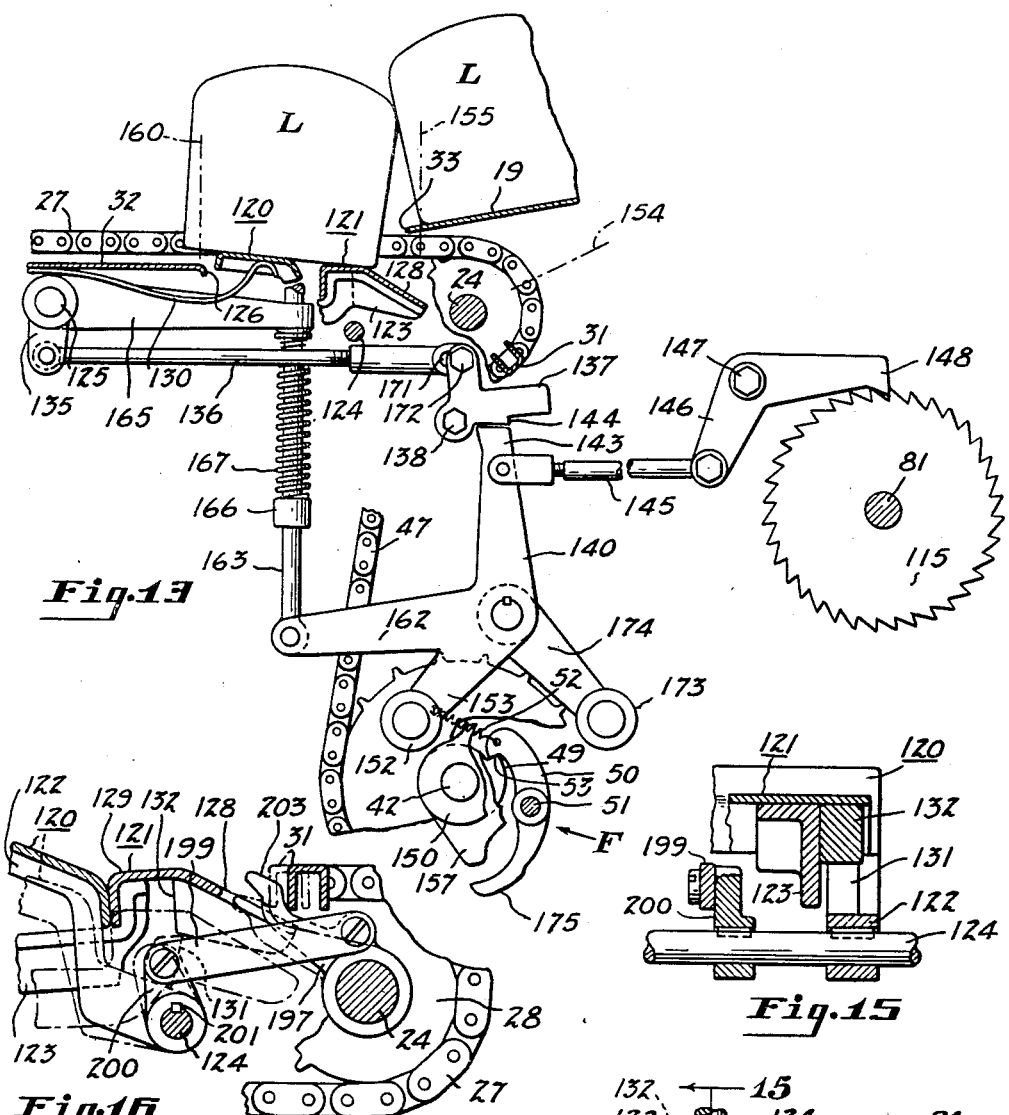
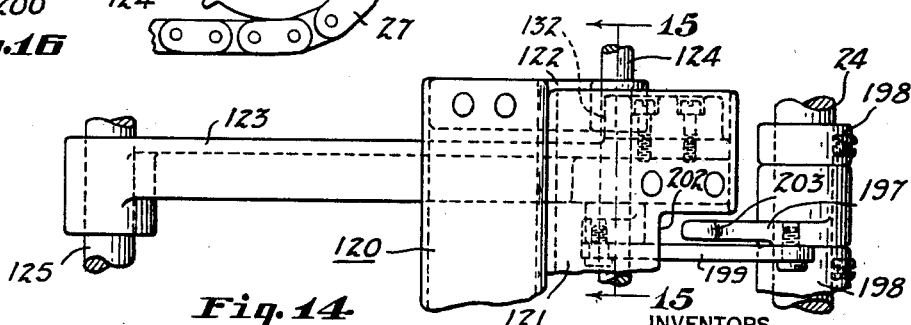
INVENTORS
WILLIAM C. PALMER
HAROLD H. MOHL
BY Evans & McCoy
ATTORNEYS Dec. 2, 1941.  W. C. PALMER ET AL  2,264,768
METHOD AND APPARATUS FOR CONVEYING ARTICLES
Filed Feb. 28, 1939  9 Sheets-Sheet 8
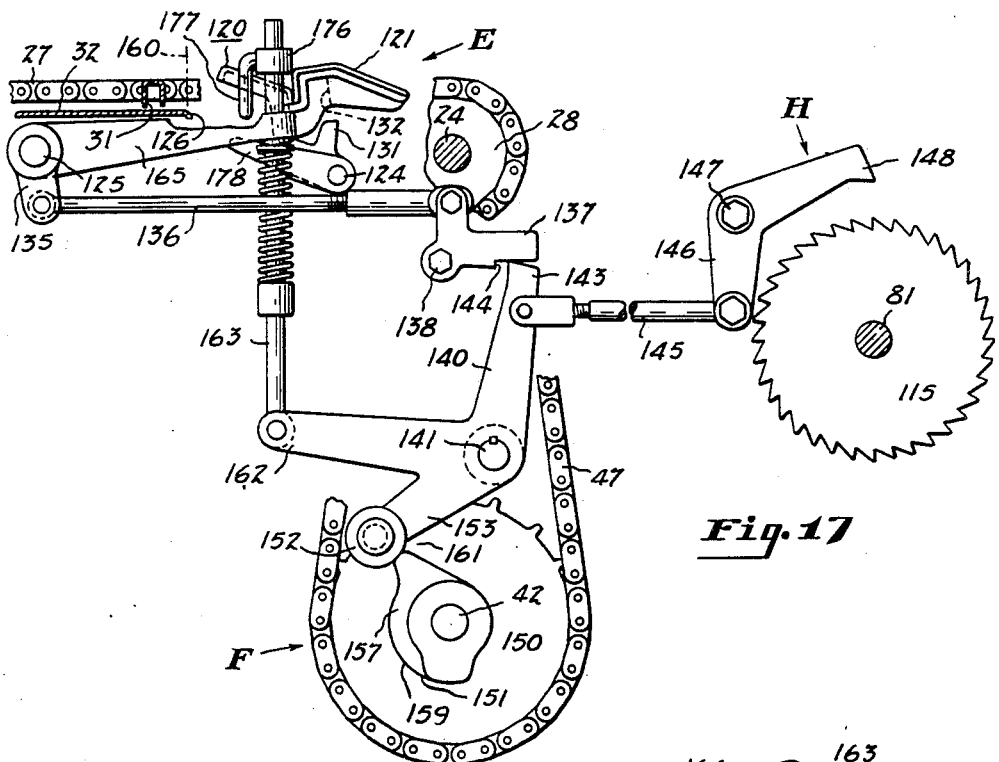
Fig. 17
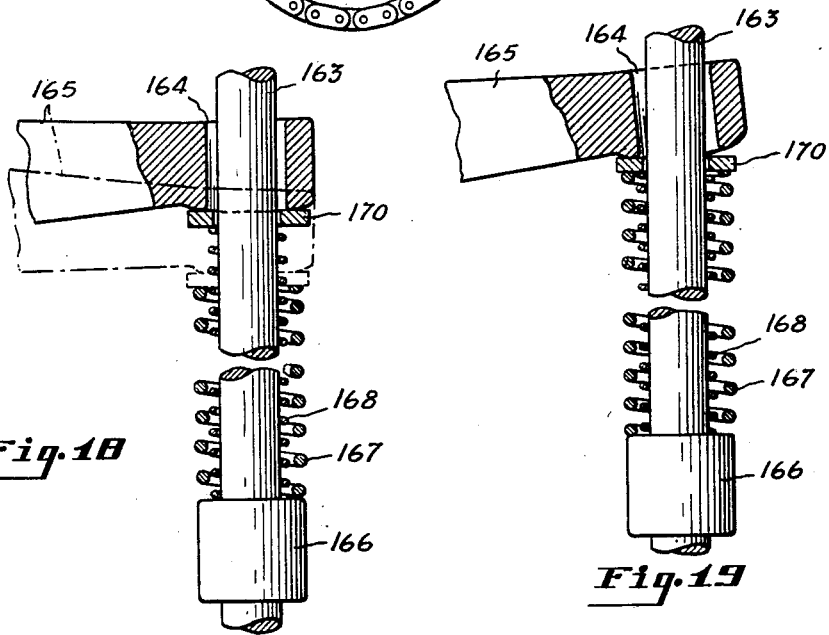
Fig. 18
Fig. 19
INVENTORS
WILLIAM C. PALMER
HAROLD H. MOHL
BY Evans & McCoy
ATTORNEYS

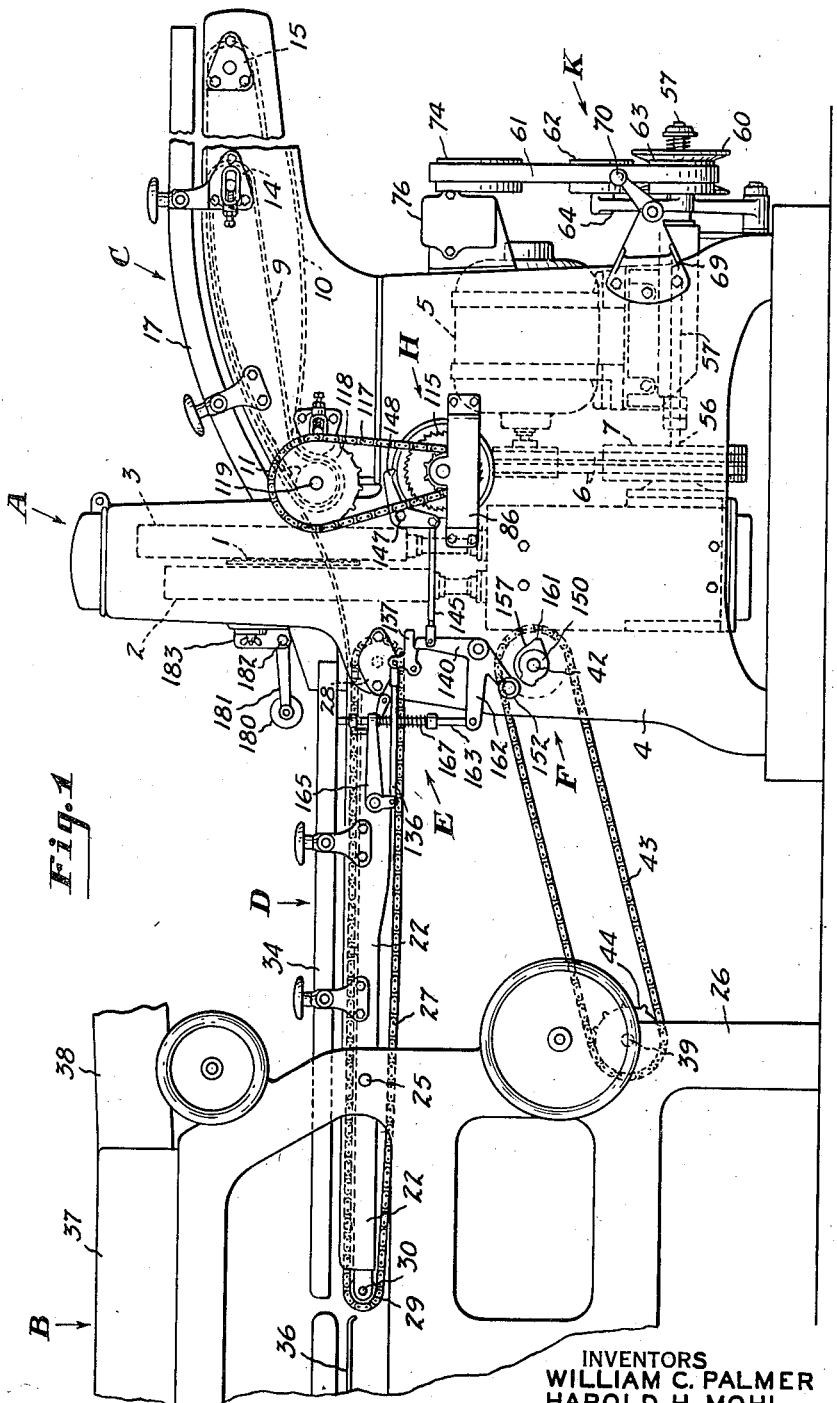

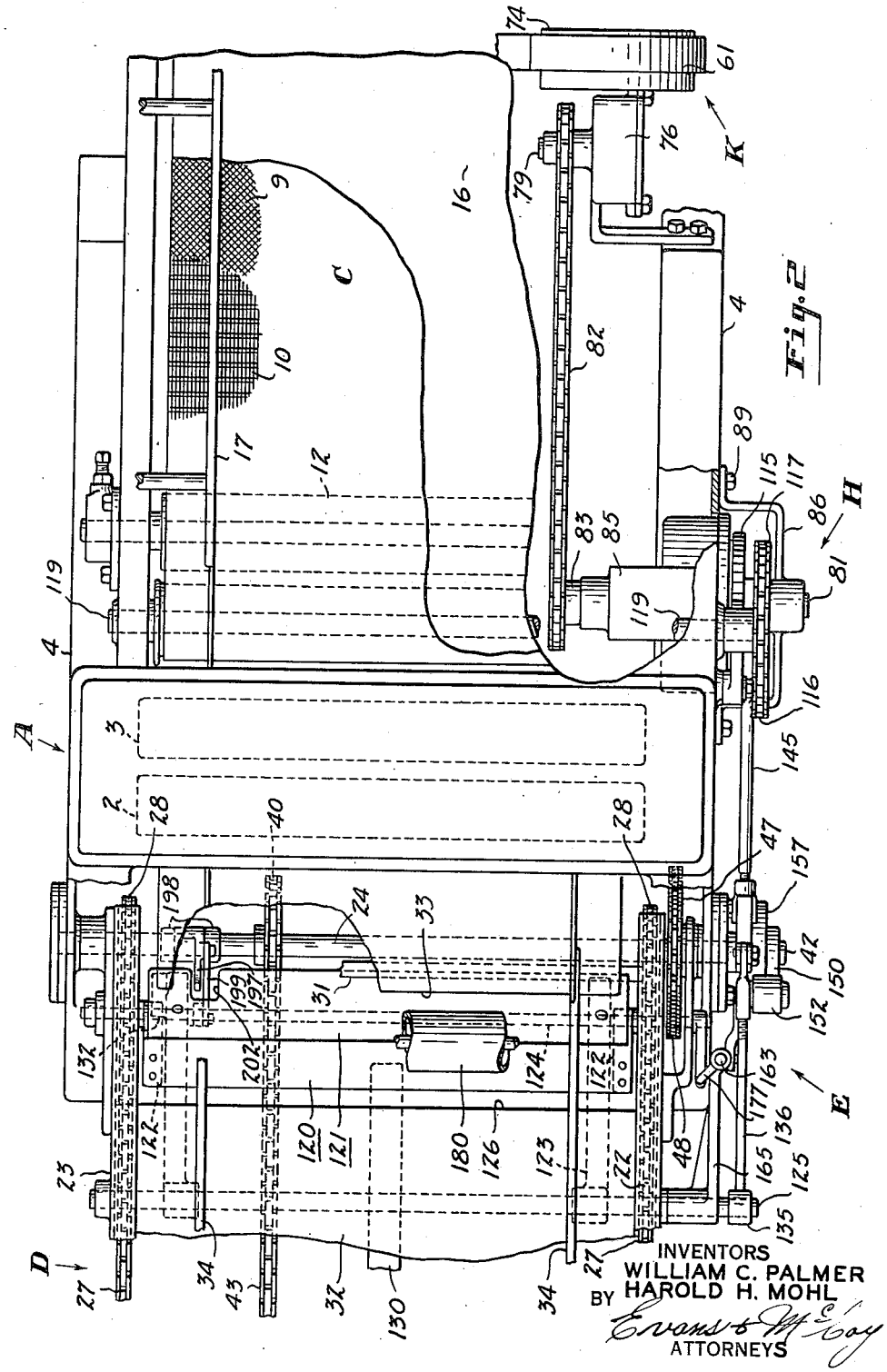

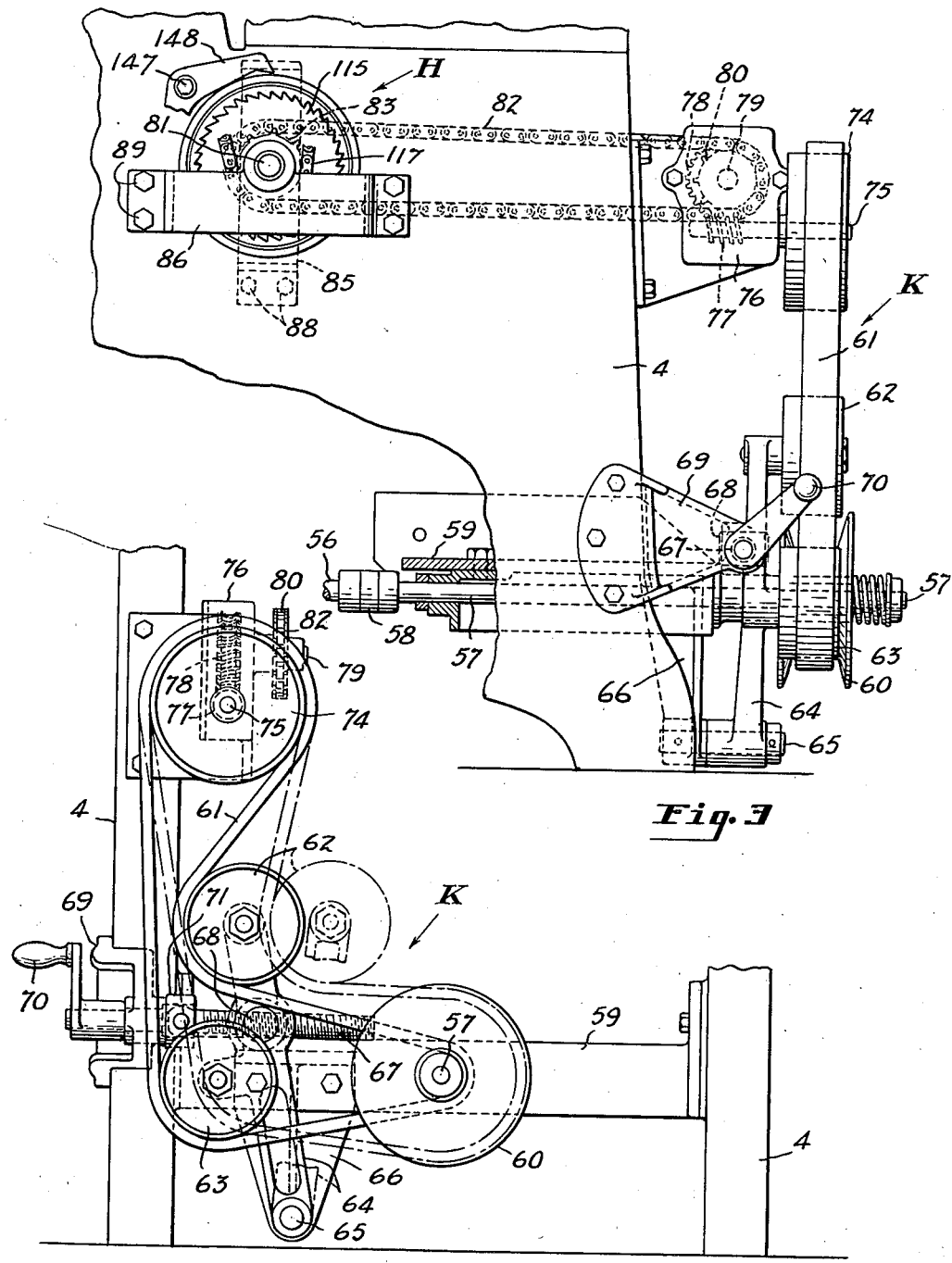

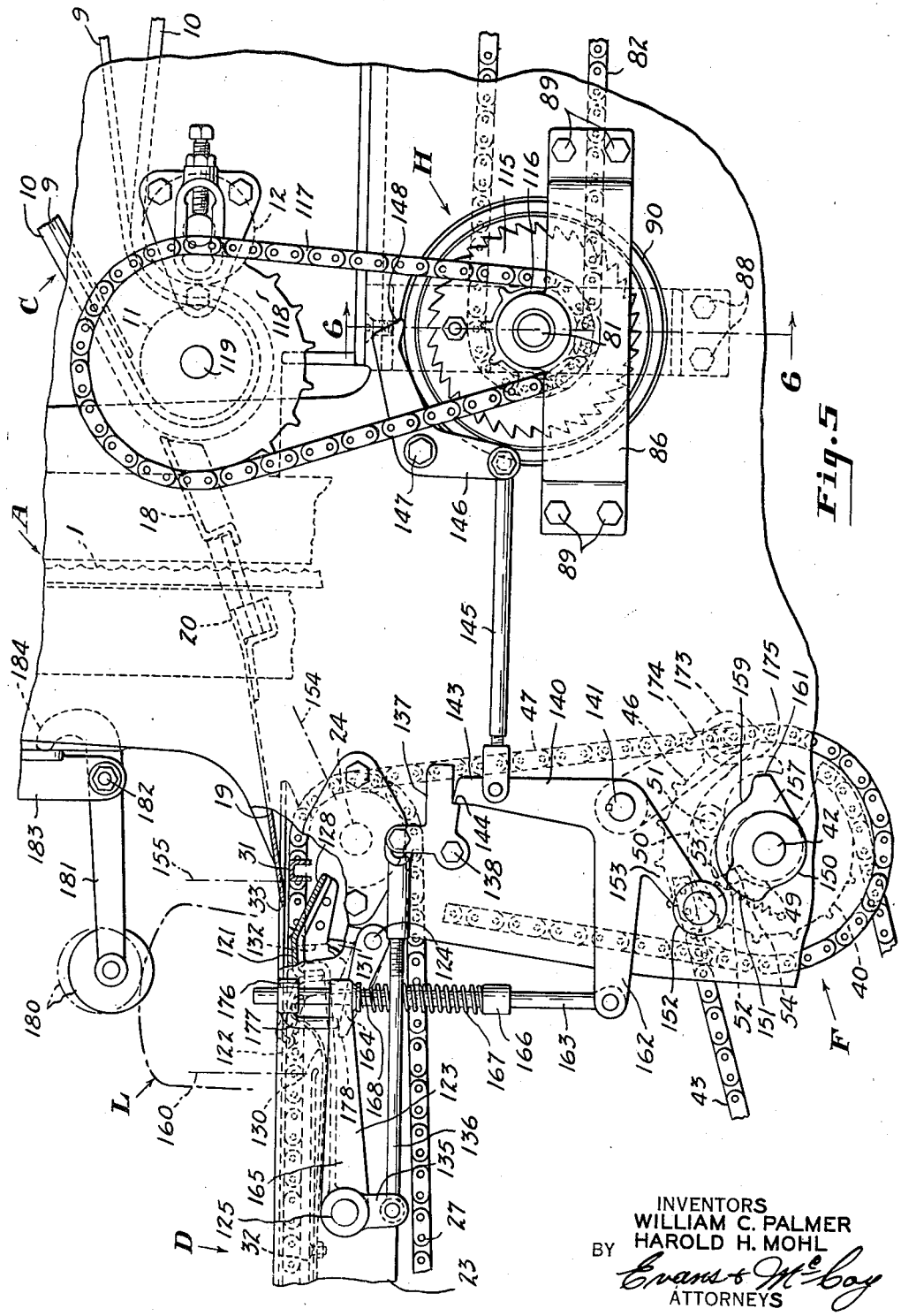

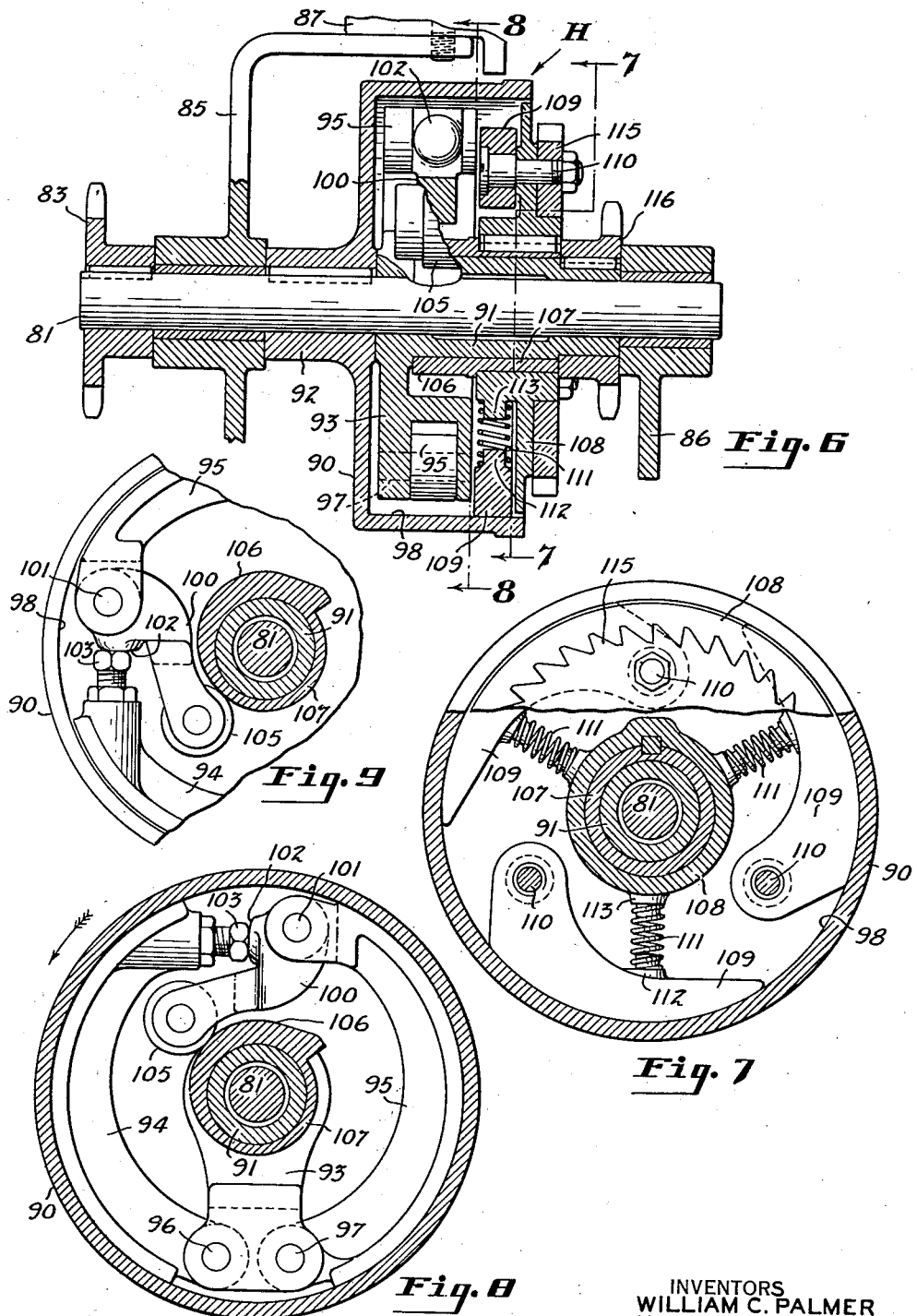

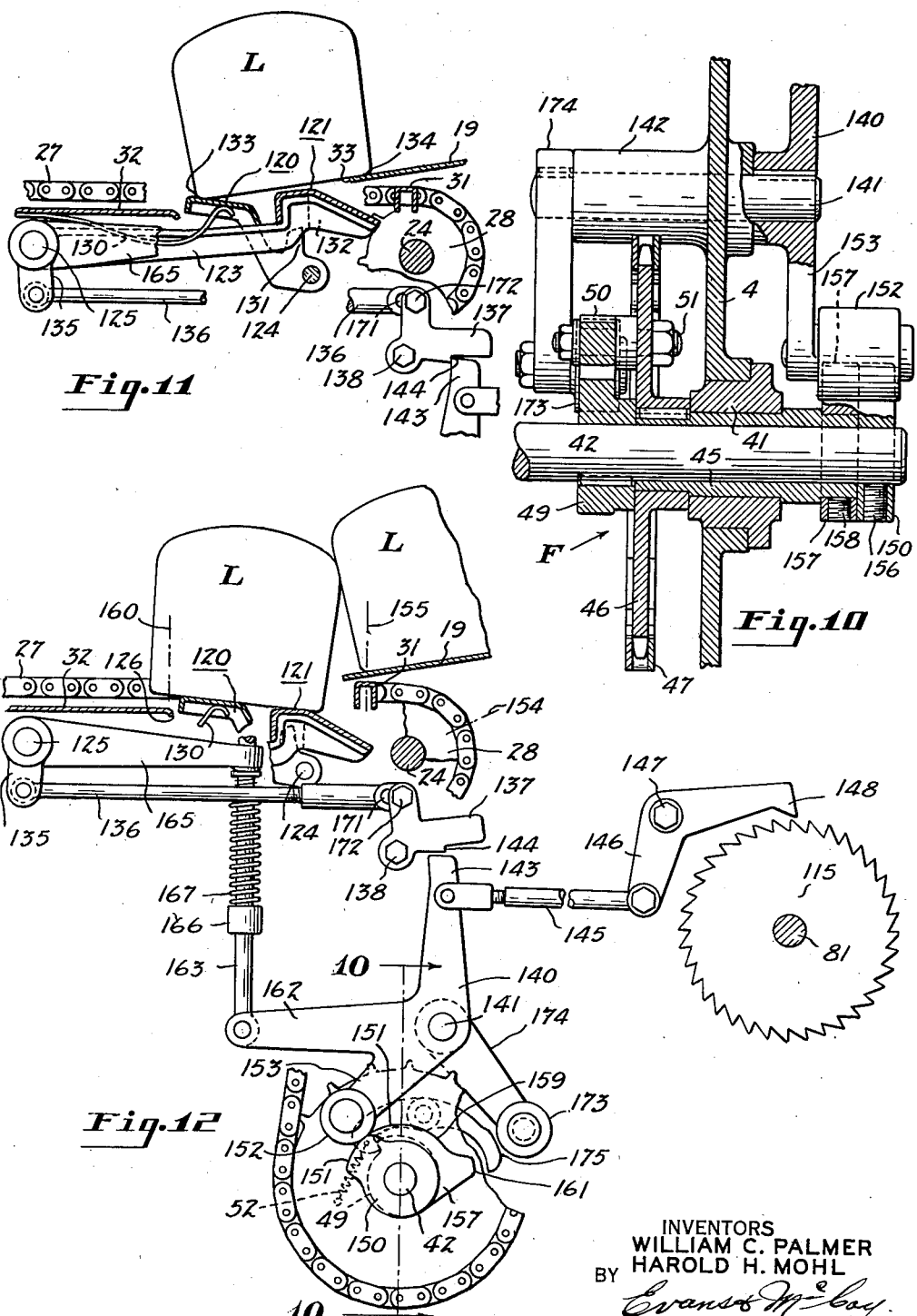

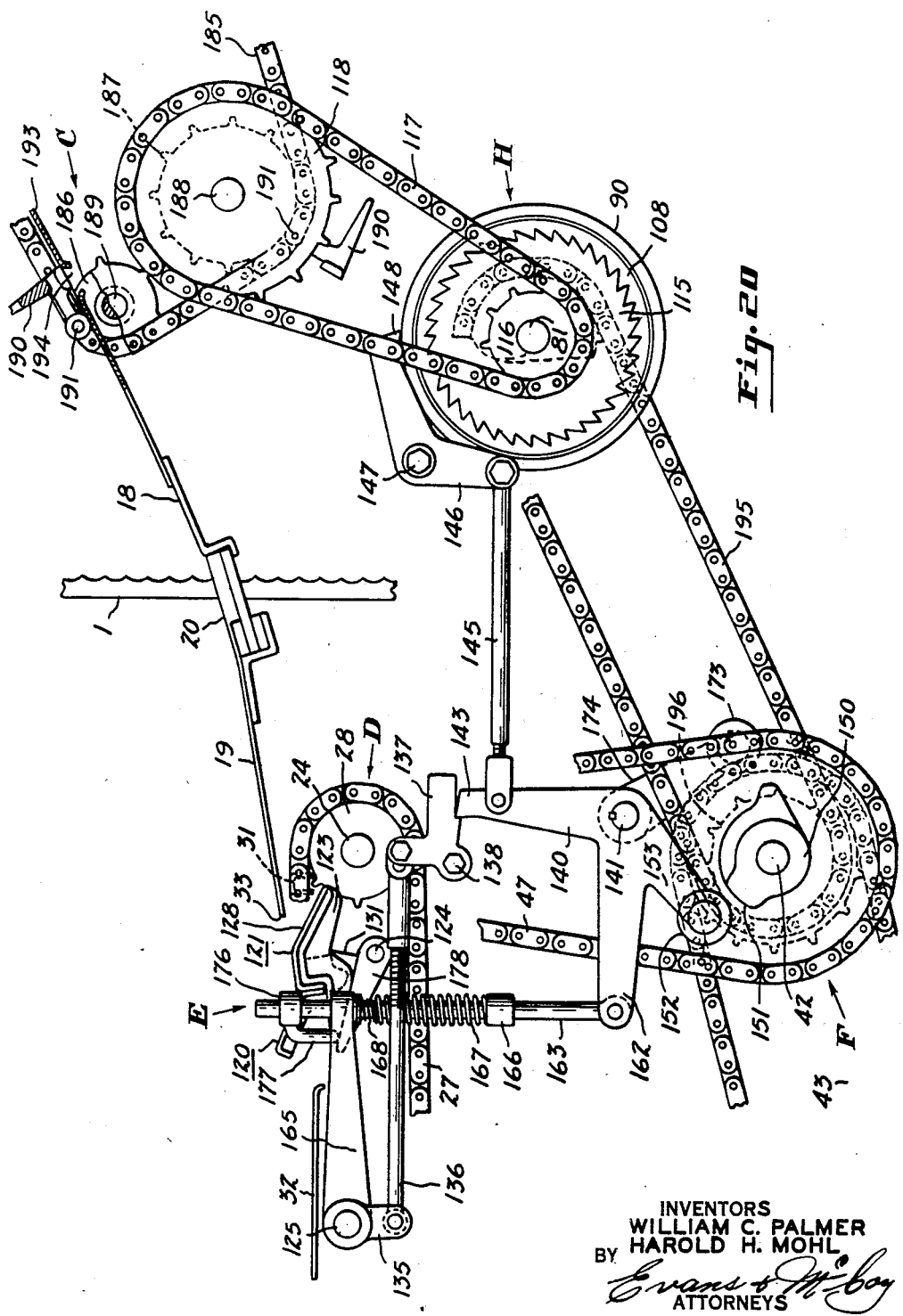

Patented Dec. 2, 1941

2,264,768

UNITED STATES PATENT OFFICE 2,264,768

METHOD AND APPARATUS FOR CONVEYING ARTICLES

William C. Palmer and Harold H. Mohl, Davenport, Iowa, assignors to Micro-Westco, Inc., Bettendorf, Iowa, a corporation of Delaware Application February 28, 1939, Serial No. 258,924

60 Claims. (Cl. 93—2)

This invention relates to conveyors, and more particularly to a conveyor system for advancing articles to a first mechanism which performs an operation thereon and for forwarding the articles from the first instrumentality to a second instrumentality for performing a second or subsequent operation thereon.

A particular application of the invention is in connection with the slicing and wrapping of baked loaves of bread. It is customary to connect a wrapping machine in tandem to a slicing machine and advance loaves in a continuous succession first through the slicing machine and then to the wrapping machine. Numerous conveyor systems have been devised to control the passage of the loaves or articles through the slicing machine and their entrance into the wrapping machine in proper sequence. In the slicing machine the cutting elements or knives are operated continuously and in order to produce more uniform and even slices without waves and without crushing of the bread, it is preferable to slice at a relatively low rate of speed. Accordingly, it is desirable to advance the baked loaves to and through the cutters in a continuous abutting series and at a substantially uniform linear speed with as little interruption in the continuous feed as possible. Thus, the loaves should move through the cutters in side by side contacting relation with one another without frequent stopping and starting of the column of loaves and without variation of the linear rate of travel so that the cutting is continuous from one loaf into the next and while passing through each loaf with no stopping of any of the loaves while being sliced.

However, wrapping machines are designed to receive loaves at uniform intervals and not in an abutting series. Hence, it is necessary to provide means for separating the articles or loaves from one another after they emerge from the slicing mechanism or instrumentality and advance them to the wrapping mechanism or instrumentality at uniform intervals and spaced apart from one another.

It is therefore an object of the invention to provide a conveyor system, particularly adaptable for use in connection with the slicing and wrapping of baked loaves, which is capable of advancing articles to and through a slicing mechanism or instrumentality in an abutting series and at a substantially uniform rate of linear travel and which is capable of separating the loaves from one another as they emerge from the slicing mechanism and of forwarding the separated loaves to the wrapping mechanism or instrumentality in spaced relation with respect to one another and at uniform intervals.

According to some slicing machine-wrapping machine combinations, the slicing machine has an infeed conveyor consisting of a plurality of spaced flights carried by endless side chains or the like and arranged to feed successive loaves into the slicing mechanism at uniform intervals. An outfeed conveyor of similar construction is coordinated or timed with the infeed conveyor and is provided with flights which receive the loaves as they emerge from the slicing mechanism and advance them to the wrapping mechanism. In such an arrangement the loaves travel for a portion of their path through the slicing mechanism or instrumentality in side by side abutting relationship with one another and the theory of operation is that for each article advanced into the abutting series in the slicing machine by the infeed conveyor, a sliced article is released from the end of the abutting series onto the outfeed conveyor. Baked loaves and similar articles are not of uniform width or size. The length of the abutting series of loaves in the slicing mechanism is thus subject to variation. Accordingly, the release of a sliced article from the end of the abutting series is apt to occur either too soon or too late for proper positioning thereof on the outfeed conveyor depending upon whether the remainder of the articles in the abutting series are oversize or undersize.

Another object of the invention, therefore, is to provide a conveyor system having controls responsive to the discharge of loaves from an abutting series thereof in a slicing mechanism to regulate the movement of the conveyor or conveyors.

Another object is to provide a method and apparatus for conveying articles to a first operating instrumentality and for forwarding articles from the first instrumentality to a second instrumentality wherein the articles move through the first instrumentality in an abutting series and upon emergence therefrom are separated from one another and advanced at uniform spaced intervals to the second instrumentality. The invention seeks an arrangement wherein the articles control the operation of the conveyors so that the infeed conveyor advancing articles to the first instrumentality is arrested when the rate at which articles are fed through the first instrumentality gets ahead of the rate at which the articles are withdrawn therefrom and advanced to the second instrumentality by the outfeed or forwarding conveyor. A more specific object is to provide in such a combination an arrangement whereby the transferring or forwarding conveyor for moving articles from the first instrumentality to the second instrumentality is arrested when the rate of speed of withdrawn articles from the first instrumentality exceeds or gets ahead of the rate of speed at which the articles are fed by the infeed conveyor.

The present invention includes in a conveyor system of a character used in a slicing machine-wrapping machine combination improvements in the means for driving the slicing machine infeed conveyor including the clutch structure for stopping and starting the infeed conveyor; the improvements in the slicing machine outfeed conveyor drive including the means for stopping and starting the same; and improvements in the means for controlling the actuation of the conveyor and their clutch mechanisms in response to the movement of articles from the slicing machine. Other objects and advantages will become apparent from the following detailed descriptions of suitable embodiments of the invention which are made in connection with the accompanying drawings, in which:

Figure 1 is a side elevational view, with parts removed, of a slicing machine-wrapping machine combination assembly of the character used in slicing and wrapping baked loaves of bread;

Fig. 2 is a fragmentary plan view, partly in section and with parts removed, of the slicing machine shown in Fig. 1 and enlarged with respect thereto;

Fig. 3 is a fragmentary side elevational detail, partly in section and with parts removed, showing the variable speed drive for the slicing machine of Fig. 1 and enlarged with respect thereto;

Fig. 4 is an end elevational view with parts removed of the variable speed drive shown in Fig. 3.

Fig. 5 is a vertical sectional view, with parts removed, taken longitudinally through the slicing machine and showing the drives for the conveyors and the controls therefor;

Fig. 6 is a sectional detail, with parts removed, showing the infeed conveyor drive clutch and taken substantially on the line 6—6 of Fig. 5, being enlarged with respect thereto;

Fig. 7 is a fragmentary detail, partly in section and with parts removed, taken substantially on the line 7—7 of Fig. 6;

Fig. 8 is a sectional detail, with parts removed, taken substantially on the line 8—8 of Fig. 6;

Fig. 9 is a fragmentary sectional detail similar to Fig. 8 and with parts removed, showing the clutch shoes released by the actuating cam;

Fig. 10 is a sectional detail, with parts removed, taken substantially on the line 10—10 of Fig. 12 and enlarged with respect thereto;

Fig. 11 is a diagrammatic fragmentary detail, partly in section and with parts removed, showing an article associated with the control levers and actuating the latch lever to release the trip lever;

Fig. 12 is a fragmentary diagrammatic detail, partly in section, similar to Fig. 11 and with parts removed, showing the movement of the controls effected by an article when the latter is advanced onto the outfeed conveyor in proper timed relation therewith;

Fig. 13 is a diagrammatic view similar to Fig. 12 showing the positions of the parts when an article is discharged from the end of the abutting series of articles in the first instrumentality before the flight of the outfeed conveyor which is to advance such article to the second instrumentality is in position to commence an article advancing movement over the upper lap of the outfeed conveyor;

Fig. 14 is a fragmentary detail in plan showing one end of the control levers;

Fig. 15 is a sectional detail taken substantially on the line 15—15 of Fig. 14;

Fig. 16 is a sectional detail, with parts removed, showing the safety release for the tripper mechanism;

Fig. 17 is a diagrammatic view similar to Figs. 12 and 13 showing the resetting of the control levers and their related mechanism;

Fig. 18 is a fragmentary detail, partly in section, showing the springs associated with the control levers;

Fig. 19 is a view similar to Fig. 17 showing the springs during resetting of the control levers; and Fig. 20 is a diagrammatic longitudinal vertical sectional view with parts removed showing an adaptation of the invention to a first or slicing instrumentality employing a flight infeed conveyor.

Referring to the drawings by letters and numerals of reference which indicate like parts throughout the several views, specific embodiments of the invention which have been found useful in the baking industry will now be described.

In Fig. 1 is shown the assembled combination of a first operating instrumentality or slicing machine A and a second operating instrumentality or wrapping machine B. Articles to be processed in the machines are loaded upon an infeed conveyor C which advances the articles to and through the first instrumentality or slicing machine A. As the articles are discharged from the slicing machine they are received by a forwarding conveyor D which transfers the articles from the first instrumentality to the second instrumentality or wrapping machine B. In this application of the invention the forwarding conveyor D serves as both the outfeed conveyor for the slicing machine or first instrumentality and the infeed conveyor of the second instrumentality or wrapping machine B. It is to be understood, however, that the forwarding conveyor D can be replaced by any desired number of conveyors operating in synchronous relation with one another and over which the articles pass in succession, in accordance with well known practice.

Each article, upon being released from the end of the abutting series of articles emerging from the first operating instrumentality A, is deposited on the receiving station of the conveyor D where it engages a tripping or control mechanism E, comprising a pair of cooperating members and pivoted levers which control the drive for both the infeed conveyor C and the forwarding conveyor D, the latter by means of a clutch structure F, Fig. 12, and the former by means of a friction clutch H, Fig. 6. In order to vary the speed of the infeed conveyor C, a variable speed control mechanism K is provided.

The slicing instrumentality A has a plurality of spaced, parallel, vertically reciprocable blades or cutters 1, Fig. 5, carried in confronting frames 2 and 3, Fig. 1, which are mounted for up and down movement between side frames 4. Suitable drive means, such as an electric motor 5, is disposed between the side frames for driving the blade frames 2 and 3 by mechanism well known in the art, including belts 6 and fly wheel 7.

The loading or infeed conveyor C comprises a relatively short endless canvas belt 9 mounted inside an endless woven wire link belt 10 for movement in parallel relation therewith. Adjacent the slicing mechanism the belts 9 and 10 are carried around a driven roller 11 journalled in the side frames 4. Preferably, a pressure roller 12 is adjustably mounted adjacent the driven roller so as to engage the bottom laps of the belts 9 and 10 and hold the latter against the driven roller 11. The end of the canvas belt 9, remote from the slicing mechanism, is carried over a rotatable roller 14 adjustably mounted in the side frames so as to apply a suitable tension to the belt. As previously mentioned, the link belt 10 is longer than the canvas belt 9 and is carried around a roller 15 journalled in the side frames beyond the roller 14 of the canvas belt and remote from the slicing mechanism. The upper laps of the endless belts 9 and 10 are supported by an apron 16 mounted between the side frames 4. Articles are guided at their ends while moving over the infeed conveyor C by adjustable side guides 17.

At the end of the infeed conveyor C adjacent the slicing mechanism the articles are received and supported by a member 18, Fig. 5, arranged as a continuation of the upper lap of the wire belt 10 and supported between the side frames 4. Articles emerging from the knives or cutters 1 are received by an inclined supporting member or plate 19 which is mounted between the side frames and in substantial alignment with the support 18. Preferably, a blade guide or comb 20 is carried by one of the supports 18 or 19, in this case the support 19, and has finger portions which extend between the cutters 1 and serve to support the articles during slicing.

The forwarding conveyor D comprises spaced substantially parallel side members 22 and 23 which are carried by driven shaft 24 journalled in the side frames 4 of the slicing instrumentality, and a rod 25 supported by side frames 26 of the wrapping instrumentality B. Endless side members or chains 27 are mounted in spaced parallel relation with one another on opposite sides of the forwarding conveyor D. The upper laps or runs of the chains 27 pass above the side members 22 and 23 in moving from the slicing machine to the wrapping machine while the lower laps or runs in moving from the wrapping machine to the slicing machine travel underneath the side members. At the slicing machine end of the forwarding conveyor the side chains 27 are trained over and driven by sprockets 28 secured on driven shaft 24 for rotation therewith. Sprockets 29 carry the side chains 27 at the wrapping machine end of the forwarding conveyor. These sprockets are freely rotatable on a shaft 30 supported by the side members 22 and 23. At uniform intervals, flights 31 are carried by the side chains 27 for movement over article supporting apron 32 disposed between the side members 22 and 23. As shown in Fig. 5, the driven shaft 24 and sprockets 28 of the forwarding conveyor D are disposed underneath the supporting member or plate 19 so that the flights 31 in commencing their movement to the wrapping instrumentality over the upper laps or runs of the side chains 27 pass closely adjacent discharge edge 33 of the supporting member 19 to engage the lower rear side of an article previously released from the supporting member 19, and push such article toward the wrapping machine over the apron 32. Adjustable side guides 34 are mounted in spaced parallel relation above the apron 32 of the forwarding conveyor to engage the ends of articles moving thereover.

Any suitable type of wrapping machine may be employed in the combination which forms the present invention, such for example as the wrapping machine shown in the co-pending application of Arthur A. Kottman, Serial No. 203,865 filed April 23, 1938. This machine has a vertically reciprocable carrier or elevator 36 which receives articles at uniform intervals from the discharge end of the forwarding conveyor D and raises such articles to the level of a folding and sealing channel 37. During the movement of the articles through the wrapping machine or second operating instrumentality of the combination, they are wrapped and then released to a cooling or discharge conveyor 38, which chills the overlapped portions of the wrapping material to seal the same.

The wrapping machine is driven by an independent motor, not shown, and has a shaft 39 which turns a predetermined number of degrees for each wrapping cycle of the wrapping machine. For example, in the embodiments illustrated, the shaft 39 is arranged to make one complete revolution for each article received and wrapped by the wrapping machine. A clutch sprocket 40 secured on a main drive shaft 42 supported between the side frames 4 of the slicing machine is driven by a chain 43 trained over a sprocket 44 secured on the wrapping machine shaft 39. Thus, the clutch sprocket 40 and drive shaft 42 are arranged to make one revolution per cycle of the wrapping instrumentality B.

At one side of the slicing machine the drive shaft 42 is journalled in a sleeve 45 (Fig. 10) which in turn is journalled in a bearing member 41 secured in one of the side frames 4. On the inside of the side frame a conveyor drive or clutch sprocket 46 is keyed on the sleeve 45 for rotation therewith. This sprocket carries a chain 47 which drives the forwarding conveyor D by means of a sprocket 48 secured on driving shaft 24. A clutch dog 49 is keyed or otherwise secured on the main drive shaft 42 in abutting relation with the inner end of the sleeve 45 and the sprocket 46. A curved pawl 50 is pivoted intermediate its ends on a bolt 51 secured in the clutch sprocket 46. By means of a spring 52, jaw 53 of the pawl 50 is urged into engagement with a shoulder 54 of the clutch dog 49. In this manner the sprocket 46 is normally driven synchronously with the main drive shaft 42 through interengagement of the shaft dog 49 and sprocket pawl 50. This combination constitutes a clutch which is adapted, when released, to effect a reengagement of the parts or members thereof only at a point or points in the revolution of the shaft spaced a definite number of degrees, such as once in each revolution. The degrees of revolution of the shaft 42 between successive points at which the clutch is adapted for reengagement are equal to the rotation of the shaft necessary to actuate the conveyor D one article forwarding movement, that is, the spacing of or distance between successive flights of the conveyor. Thus, although a flight of the conveyor D may remain in engagement with an article during several revolutions of the shaft 42 while advancing the article from the slicing machine A to the wrapping machine B (the number of degrees of angular movement or rotation of the shaft depending on the length of the conveyor and the number of flights thereon) an article forwarding movement is referred to as the distance between successive flights of the conveyor since such distance is substantially the movement required after the receipt of an article before the conveyor is in position or condition to receive the next article. Accordingly, the forwarding conveyor which is driven in synchronous timed relation with the operating cycle of the wrapping instrumentality can be arrested by disengagement of the pawl 50 and dog 49, but reengagement of these parts can only occur to effect a driving engagement between the shaft 39 of the wrapping machine and the forwarding conveyor D when the flights 31 of the latter are in synchronous or timed relation with respect to the operating cycle of the wrapping machine.

The flywheel 7 of the slicer or first operating instrumentality is mounted on a shaft 56 to which shaft 57 of the variable speed drive K is connected by a flexible coupling 58. The shaft 57 is journalled in a cross member 59 supported between the side frames 4 and has secured thereon a spring pressed split pulley 60 which actuates a driven pulley 74 by means of a flexible V-belt 61. Idler pulleys 62 and 63 for the belt 6 are mounted on an arm 64 pivoted at 65 on a bracket 66 depending from the cross member 59. A screw rod 67 has threaded engagement with a block 68 pivotally attached to the arm 64. The screw 67 is journalled in a bracket 69 attached to one of the side frames and is held against endwise movement by a collar 71 and the hub of a hand crank 70 which abuts the journal. The hand crank is secured on the screw on the outside of the side frame and rotation of the screw 67 moves the arm 64 toward or away from the shaft 57. In this manner the tension in the belt 61, trained over the idlers 62 and 63, may be varied to spread the split pulley 60 to change the effective diameter thereof.

The driven pulley 74 is secured on a shaft 75 journalled in a housing 76 attached to one of the side frames 4. Within the housing 76 a worm 77 is secured on the shaft 75 and meshes with a gear 78 secured on a short shaft 79 also journalled in the housing 76. Externally of the housing a sprocket 80 is secured on the shaft 79 and actuates infeed or loading conveyor driveshaft 81 by means of a chain or belt 82 which is trained over a sprocket 83 secured on the inner end of the shaft. This shaft is journalled in bearings carried by inner and outer brackets 85 and 86 respectively. The top of the inner bracket is secured to an inwardly projecting flange 87 of the frame 4 while the bottom is bolted at 88 to the inside of the frame beneath the shaft 81. The outer bracket 86 is bolted at 89 to the outside of the frame on opposite sides of the shaft 81. A cylindrical drum or housing 90 is secured on the shaft 81 between the brackets 85 and 86 and is disposed in a circular opening formed in the side frame of the slicer. The drum 90 is open at one end and receives a sleeve member 91 which is loosely mounted on the shaft 81. At the end of the sleeve 91 which abuts hub 92 of the housing is formed a radial arm 93 which has a pair of segmental friction shoes 94 and 95 pivoted thereto at 96 and 97 respectively. These shoes are arranged concentrically about the shaft 81 for frictional engagement with the inwardly directed cylindrical friction surface 98 of the drum 90. The shoes are forced against the surface 98 by means of a lever 100 pivoted at 101 in the end of the shoe 95 opposite the pivot 97 and having a shoulder 102 which is engaged by an adjustable stud 103 secured in the end of the shoe 94 opposite the pivot 96. Roller 105 mounted in the free end of the lever 100 is engaged by a cam surface 106 formed on a supplementary sleeve 107 freely rotatable on the sleeve 91. Upon rotation of the supplementary sleeve 107 in a counterclockwise direction, as viewed in Fig. 8, surface 106 forces the roller 105 radially outward pivoting the lever 100 in a clockwise direction and spreading the shoes 94 and 95 into frictional engagement with the surface 98 of the drum 90, thus establishing a driving connection between the shaft 81 and the sleeve 91.

On a reduced diameter portion of the supplementary sleeve 107 is keyed the hub of a circular disk 108 disposed in the open end of the drum or housing 90 and serving as a closure for the latter. On the inside of the disk 108 are a plurality of friction shoes 109, each of which is pivoted at one end on an axially disposed shoulder bolt 110 secured to the disk 108. The shoes 109 are urged outwardly into frictional engagement with the surface 98 of the drum 90 by means of helical compression springs 111, the ends of which are received on bosses 112 formed on the friction shoes 109 and bosses 113 formed on the hub of the circular disk 108. A ratchet gear 115 is secured on the outside of the disk 108 by the bolts 110 and is arranged to be engaged by a detailing lever, which will later be described, for the purpose of arresting rotation of the disk 108 and supplementary sleeve 107.

The main infeed conveyor drive shaft 81 is arranged to be rotated in a counterclockwise direction as viewed in Figs. 1, 3, 5, 7, 8, 9, 12, 13, 17, and 20 by the motor 5 and variable speed driving mechanism K previously described. Thus the housing 90 is rotated in the direction indicated by the arrow in Fig. 8. The friction shoes 109, held in engagement with the surface 98 of the drum, tend to carry the disk 108 and supplementary sleeve 107 in a counterclockwise direction as viewed in Figs. 7 and 8. Thus when the primary sleeve 91 is stationary there is a relative motion of the supplementary sleeve 107 with respect thereto which moves the cam surface 106 under the roller 105 actuating the arm 100 to distend the clutch shoes 94 and 95 into frictional engagement with the surface 98 of the housing or drum until the sleeve 91 rotates synchronously with the drum 90 and shaft 81. When a driving connection is thus established between the shaft 81 and sleeve 91 the drum 90 and parts enclosed thereby rotate as a unit. Upon arresting the rotation of the sleeve 107, the shoes 94 and 95 are released and sliding engagement occurs between the drum 90 and friction shoes 109, the latter being made of a suitable wear-resisting material such as brass or the like which permits this sliding movement without excessive wear.

On the reduced diameter outer end of the sleeve 91 is keyed a sprocket 116 which drives a chain 117 carried over a sprocket 118 secured on driving shaft 119 of the infeed conveyor. This shaft is journalled in the side frames of the slicing instrumentality and has secured thereon for rotation therewith the driven roller 11, previously mentioned. In this manner the infeed or loading conveyor C is driven by the same motor 5 which actuates the slicing mechanism, and there is no driving connection between the infeed conveyor and the discharge or forwarding conveyor D.

In order to coordinate the conveyor system it is necessary that some means be provided to regulate the rate of feed of articles to and through the slicing machine A by the infeed or loading conveyor C with respect to the rate at which such articles are withdrawn or removed therefrom by the forwarding or discharge conveyor D. According to the present invention this coordination is effected by stopping and starting the infeed and forwarding conveyors by means of the friction clutch H and one-point clutch F, respectively, in response to the movement of articles or loaves L from the support plate 19 of the slicing mechanism onto a receiving station at one end of the forwarding conveyor. The trip mechanism E is located at the receiving station and comprises a latch or trip member 120 and a trip member 121 carried on the ends of latch or trip levers 122 and trip levers 123 respectively. The latch levers are pivoted on a shaft 124 journalled in the side members 22 and 23 of the forwarding conveyor D adjacent the slicing machine end of the latter while the trip levers 123 are secured on a shaft 125 which is also journalled in the side members 22 and 23 in parallel relation with respect to the shaft 124 and spaced toward the wrapping machine from the latter. The latch levers 122 extend toward the trip lever shaft 125 and the trip levers 123 extend toward the latch lever shaft 124, being disposed above the latter in crossed relation with respect to the latch levers. A gap or space between the discharge edge 33 of the support plate 19 of the slicing machine, and receiving edge 126 of the forwarding conveyor apron 32 accommodates the latch member and trip member. The latter has an inclined portion 128 which slopes downwardly in the direction of the slicing machine and is partially disposed beneath the edge 33 of the support plate 19 and a normally substantially horizontal portion 129 disposed substantially in line with the plate 19.

The trip mechanism E is arranged to actuate the clutch controls only in response to an article which is completely moved or discharged from the support plate 19. The latch member 120 is normally urged upwardly by a relatively light spring member 130 which readily yields to a weight or load imposed on the latch member. One of the latch levers 122 carries a bearing member 131 which engages a pad 132 carried underneath the trip member 121 by one of the trip levers 123 to support the trip member in its normal position shown in Figs. 5 and 20. During the movement of an article or loaf L from the support plate 19 of the slicing machine onto the receiving station of the discharge conveyor, the article first engages and rests upon the trip member 121 which is not depressed thereby, but sustains the weight of the article, being held up or supported by the pad 132 of the trip member which rests on the bearing 131 of the latch member. As the loaf L continues to advance off the plate 19, leading edge 133 thereof rides over the trip member and onto the latch member to substantially the position shown in Fig. 11. The article-engaging surface of the latch member is inclined upwardly from the substantially horizontal portion 129 of the trip member and is substantially parallel to the inclined portion 128 of the trip member. Accordingly, as the article L is pushed off the plate 19 its leading edge 133 rides up the inclined surface of the latch member, relieving the trip member 121 of the weight of the article so that when the article is as far advanced as the position shown in Fig. 11 it is supported by its front edge 133 which rests on the latch member 120, and its rear edge 134 which rests on the support plate 19 adjacent the discharge edge 33 thereof. In this position the weight of the article overcomes the resistance of the spring member 130 and depresses the latch member to the position shown in Fig. 11 in which the bearing member 131 is withdrawn from beneath the pad 132 of the trip member 121. Upon continued movement of the article or loaf L it is released from the discharge edge 33 of the support plate 19 so that the rear or trailing edge 134 thereof drops onto the trip member 121 to depress the latter as shown in Fig. 12. Because of the fact that the article is supported by the latch member 120 and discharge plate 19 of the slicing machine the trip levers 123 cannot be actuated until the article is completely discharged onto the receiving station from the plate 19 of the first operating instrumentality or slicing machine.

On an end of the trip lever shaft 125 which extends beyond the supporting member 22 of the forwarding conveyor is secured a relatively short lever 135 which is connected by an adjustable length link 136 to one arm of a latch 137 pivoted at 138 on the outside of the slicing machine frame. A multiple or triple armed control member 140 is secured for pivotal movement outside the slicing machine frame on a stub shaft 141 journalled in an elongated boss 142 secured in the frame of the slicing machine near the bearing member 41 for the sleeve 45 and shaft 42. The tendency of the control member 140 is to rotate or pivot about the shaft 141 in a counterclockwise direction as viewed in Fig. 5. In the construction shown, this tendency is effected by gravity, but a spring (not shown) could also be used. Upstanding arm 143 of the control member 140 is normally engaged by shoulder 144 of the latch 137 to prevent the gravity induced rotation of the control member 140.

An adjustable length link 145 connects the upper end of the arm 143 to arm 146 of a bell crank lever pivoted at 147 to the side frame of the slicing machine adjacent the friction clutch H. The other arm of this bell crank lever has an end or detent portion 148 which is movable to engage the teeth of the ratchet gear 115 to stop the same and arrest the driving connection between the shaft 81 and the infeed conveyor C in the manner previously described. The adjustment of the links 136 and 145 is such that when the trip member 121 is in its normal position the shoulder 144 of the latch 137 is in engagement with the arm 143 of the control member 140, and the detent end 148 of the bell crank lever is held out of engagement with the ratchet gear 115, thus maintaining the driving connection for the infeed or loading conveyor through the friction clutch H.

Upon movement of a loaf or article L wholly off the discharge plate 19 so that the trip lever 121 is depressed thereby, (as shown in Fig. 13) the link 136 is drawn to the left pivoting the latch 137 in a counterclockwise direction to withdraw the shoulder 144 thereof from the arm 143 of the control member 140. The latter then rotates by gravity in a counterclockwise direction, drawing the link 145 to the left and pivoting the bell crank lever in a clockwise direction so as to bring the detent end 148 into engagement with the teeth of the ratchet wheel 115. The rotation of the latter and of the disk 108 is arrested to interrupt the drive of the infeed conveyor so that the latter stops and the movement of articles into and through the first or slicing instrumentality ceases substantially immediately. Thus the article L which has been discharged from the plate 19 of the slicing machine onto the tripping mechanism E is no longer pushed from the rear by succeeding articles in the slicing machine but remains substantially in the position in which it is deposited at the receiving station on the tripping members and apron of the discharge conveyor, until engaged and forwarded by one of the flights 31.

However, as stated previously, it is preferable that the movement of articles through the first or slicing instrumentality be substantially continuous and uninterrupted. The reason for arresting the infeed conveyor in the manner described above is to prevent the discharge of articles or loaves L onto the forwarding conveyor D faster than they can be individually engaged and advanced by the flights 31. When the speed of the infeed conveyor C is adjusted, with respect to the speed of the forwarding conveyor D, by means of the variable speed mechanism K, so that an article is discharged from the end of the abutting series of articles in the slicing machine onto the forwarding conveyor in proper time to be engaged by one of the flights 31 thereof, it is unnecessary to arrest the infeed or loading conveyor since the danger of depositing more than one article in advance of a single flight is not present. To accomplish this result, we secure a primary cam 150 on the end of the conveyor main drive shaft 42 in abutting relation with the end of the sleeve 45. This cam thus makes one revolution for each revolution of the wrapping machine shaft 39 or for each operating cycle of the wrapping machine. Also, when the forwarding conveyor D is operating, the cam 150 makes one revolution for each movement of the forwarding conveyor equal to the spacing of the flights 31, or, in other words, for each article forwarding movement of the conveyor, as previously defined.

A surface 151 on the cam 150 engages a roller 152 rotatably carried on the end of arm 153 of the control member 140 to limit the rotative movement of the control member, as shown in Fig. 12. Thereby the end 148 of the bell crank lever is prevented from engagement with the ratchet wheel 115 of the friction clutch H and for a brief period the driving connection to the infeed conveyor C is maintained even though an article L has been deposited on the trip member 121 from the discharge plate 19 of the slicing instrumentality. The surface 151 of the primary cam 150 is of such circumferential or arcuate length and is so synchronized with respect to the flights of the forwarding conveyor that the roller 152 is engaged thereby during the movement of each flight in approaching the receiving station of the forwarding conveyor, and remains in contact therewith until the approaching flight has moved beyond the position at which it would stop upon arresting the movement of the forwarding conveyor in the manner to be later described. For example, the leading edge of the cam surface 151 may be in underlying relation with respect to the roller 152 when each flight is at line 154 and the cam remains in contact with the roller until the flight has moved to a position beyond that indicated by line 155 (which line marks the position of the flight when the forwarding conveyor is arrested by disengagement of the dog 49 by the pawl 50). Thus, if an article should be discharged from the plate 19 so as to depress the trip levers after a flight has passed the line 154, the primary cam 150 will prevent stopping of the infeed or loading conveyor. As shown in Fig. 10, the cam 150 is adjustable on the shaft 42 and is held in position by means of a set screw 156 so that the position of the line 154 can be advanced or retracted to vary the portion of the flight path during which the trip mechanism E is ineffective to arrest the movement of the infeed or loading conveyor.

Upon the discharge of an article from the support 19 of the slicing machine onto the receiving station of forwarding conveyor D while one of the flights 31 of the latter is between the lines 154 and 155, the raised surface 151 of the cam 150 engages the roller 152 and continues the infeed conveyor C in operation and the flight 31 engages the rear side of the article supported by the control members 120 and 121 to forward such article away from the receiving station and over the conveyor apron 32 toward the wrapping or second operating instrumentality.

A secondary cam 157 is adjustably secured on a reduced diameter end portion of the sleeve 45 by means of a set screw 158 and in abutting or sliding relation to the primary cam 150. Arcuate cam surface 159 on the secondary cam 157 is of substantially the same radius as the cam surface 151 of the primary cam 150 and extends as a continuation of the latter to support the roller 152 when the latter moves off the primary cam and the conveyors are in continuous synchronous operation. Thus the secondary cam prevents movement of the control member 140 to actuate the clutch H and arrest the infeed conveyor while the flights 31 move over a portion of their path from about the line 155 to substantially the line 160.

At the end of the cam surface 159 which last contacts the roller 152, the secondary cam 157 is formed with a crest 161 of greater radius than the cam surfaces 151 and 159. Upon movement of the crest 161 under the roller 152 the control member 140 is pivoted in a clockwise direction to substantially the position shown in Fig. 17 to reset the control members 120 and 121 for the next article or loaf L.

The cams 150 and 157 normally rotate in synchronism with one another and in side by side relation while both conveyors remain in continuous operation. Upon stopping of the forwarding conveyor D, however, the rotation of the sleeve 45 is arrested and the cam 157 remains motionless while the cam 150 continues to rotate synchronously with the shaft 42. When the clutch dog 49 engages the pawl 50 to start the conveyor D, as will later appear, the secondary cam 157 again takes up its synchronous rotation with the primary cam 150 in the same relative position as previously existed.

A laterally extending arm 162 is formed on the control member 140 and at its end pivotally supports a rod 163 which extends upwardly therefrom and has a sliding fit in an aperture 164 formed in the end of a lever 165 secured on the trip shaft 125.

A collar 166 (Figs. 18 and 19) adjustably secured on the rod 163 supports a relatively stiff helical compression spring 167 and a relatively weak helical compression spring 168 of greater axial length than the spring 167. An annular bearing member or washer 170 is disposed about the rod 163 and rides on the springs 167 and 168. This washer bears against the under side of the arm 165 about the aperture 164. The relatively weak spring 168 is preferably disposed concentrically within the relatively strong spring 167 and is of a rigidity or stiffness merely sufficient to support the weight of the trip member 121 and related parts when the trip member is released by the bearing member 131 of the latch mechanism. The spring 168 is sufficiently weak so that the released trip member is very sensitive and will move downwardly upon the imposition of a very light load. The springs 167 and 168 are of such difference in length that the longer weak spring 168 may be depressed by the arm 165 enough to permit release of the control member 140 by the latch 137 before the top of the heavy spring 167 engages the bearing member or washer 170. This movement of the arm 165 is indicated in Fig. 18 wherein the full line position illustrates the normal position of the parts as in Figs. 5, 17, and 20, when the control members 120 and 121 are set for receiving an article from the discharge plate 19 of the slicing machine, and the broken lines indicate the position of the arm 165 when the control members 120 and 121 have been depressed by an article or loaf L as shown in Figs. 12 and 13.

As the crest 161 of the secondary cam 157 pivots the control member 140 to the position shown in Fig. 17, the weak spring 168 is compressed sufficiently so that the strong spring 167 engages the bearing washer 170 and raises the arm 165 (Fig. 19) to lift the trip member 121 above its normal position. The latch member 120 is then lifted by the leaf spring 130 so as to position the bearing member 131 thereof beneath the pad 132 of the trip member. As the crest 161 moves beyond the roller 152 the control member 140 is released and moves to its normal position, the shoulder 144 engaging the arm 143 and the bearing member 131 of the latch member engaging the pad 132 of the trip member to support the latter in its normal position.

The connection between the link 136 and the latch 137 is by means of elongated slot 171 (see Fig. 11) in the link and a bolt 172 secured in the end of an upstanding arm of the latch and passing through the elongated slot 171. This construction permits slight longitudinal movement of the link 136 with respect to the latch arm during the resetting of the control members so that the end of the arm 143 can ride under the shoulder 144 of the latch without straining or injuring the mechanism.

The relatively strong spring 167, while being sufficient to elevate the trip member 121 for resetting the same, is adapted to yield in the event the control mechanism becomes jammed or stuck, thus preventing injury thereto.

The crest 161, while moving under the roller 152, prevents engagement of the ratchet gear 115 by the detent 148 which would arrest the infeed conveyor C, and upon release of the roller 152 by the crest 161 the detent 148 continues to be held disengaged from the ratchet gear 115 by the engagement of the shoulder 144 of the latch 137 with the arm 143 of the control member 140. Accordingly, during the movement of the flights 31 from the position 154 of their path to the position where they clear the trip or control members the latter are incapable of actuating the clutch H to arrest the infeed conveyor. After the flights have cleared the trip members the latter are set in their normal position so that the infeed conveyor continues in operation.

In the event that one of the flights 31 moves to the position shown in Fig. 5, underneath the discharge plate 19 of the first instrumentality and adjacent the discharge edge 33 thereof and no article has been deposited on the latch and trip members 120 and 121, a roller 173 carried by arm 174 secured on the end of the stub shaft 141 inside the slicing machine frame, engages surface 175 of the pawl 50 to disengage the jaw 53 of the pawl from the shoulder 54 of the clutch dog 49, thus arresting the movement of the forwarding conveyor D. This conveyor remains motionless until the pawl 150 reengages the clutch dog 49, which can only occur when the shaft 42, driven in synchronism with the operating cycle of the wrapping machine B, has made at least one complete revolution, or a multiple thereof, so that when the forwarding conveyor is picked up or started it does so in perfect synchronism with the operating cycle of the wrapping machine or second operating instrumentality. The roller 173 continues to hold the pawl 50 out of engagement with the clutch dog 49 (Fig. 5) until a loaf L is deposited on the control members 120 and 121 to depress the latter and release the control member 140. If the trip member 121 should be depressed so that the control member 140 releases the pawl 50 when the shoulder 54 of the clutch dog 49 has moved beyond the jaw 53 of the pawl 50, the forwarding conveyor D remains motionless until the dog engages the pawl on its next revolution.

The cam 157 is adjusted on the sleeve 45 so that the stopping of the clutch sprocket 46 upon engagement of the pawl 50 by the roller 173 stops the cam short of, or before it reaches, the position in which the surface 159 thereof can engage the roller 152 of the control member 140 upon release of the control member by the trip mechanism. Accordingly, if an article is discharged from the support member 19 of the slicing instrumentality while the forwarding conveyor D is stopped, the control member 140 is actuated to move the detent 148 into engagement with the ratchet gear 115 and arrest the infeed or loading conveyor C so that the advancement of articles into and through the slicing machine is arrested until the movement of the forward conveyor D is resumed. In this connection it is to be noted that while the cam 157 moves with the clutch sprocket 46 of the forwarding conveyor and stops when the latter stops, the cam 150 rotates continuously with the main drive shaft 42 which is driven synchronously with the wrapping machine B. Hence, even though the forwarding conveyor is arrested there is a short time interval during which an article deposited on the trip member 121 fails to arrest the infeed conveyor C. This time interval is determined by the length of the cam surface 151 which engages the roller 152 to temporarily prevent movement of the detent arm 148 of the bell crank lever from engaging the teeth of the ratchet gear 115. The length of the cam surface 151 is relatively short however, and, accordingly, the time interval, during which the infeed or loading conveyor C continues to operate after the discharge of an article onto the forwarding conveyor from the slicing machine, is insufficient to advance the next succeeding article off the discharge plate 19, and the positioning of more than a single loaf on the forwarding conveyor to be advanced into the wrapping machine by a single flight upon the resumption of movement by the forwarding conveyor D is avoided.

On the upper end of rod 163 is adjustably secured a collar 176 having a finger 177 engageable with the end of an arm 178 secured on the latch shaft 124. When the control member 140 is released by the cams 150 and 157 so as to draw the rod 163 downwardly, the finger 177 holds the latch member 120 in its lowermost position shown in Figs. 12 and 13, so as to permit the movement thereover of one of the flights 31.

Across the receiving end of the forwarding conveyor and above the control members 120 and 121 is suspended a weighted roller 180 journalled in the ends of the arms 131 pivoted at 182 to brackets 183 secured to the side frames of the slicing machine A. Extensions 184 of the arms 181 engage the rear sides of the brackets 183 to limit the downward pivotal movement of the arms 181 as shown in Fig. 5. The roller 180 rests on the top of an article discharged from the support plate 19 of the slicing machine so as to force the article or loaf downwardly against the control members 120 and 121 and insure actuation of the latter to operate the control mechanism. Additionally, the roller prevents inadvertent movement of an article off the discharge plate until positively forced therefrom by the pressure of succeeding articles.

In operating a set of instrumentalities, such as the slicing machine and wrapping machine combination shown, in association with the conveyor system of the present invention, articles or loaves L are placed on the infeed conveyor C and the wrapping machine and slicing machine motors started to set the apparatus in motion. The infeed conveyor advances the articles between the side guides 17 into the slicing blades or cutters 1 in side by side abutting relation to one another. The articles are supported by the members 18 and 19 and are advanced over the latter in a continuous succession. The cutting of the articles by the blades 1 is continuous from one article to the next without idling and without gaps occurring between successive articles.

As the leading article is pushed off the discharge end 33 of the support 19 the top thereof is engaged by the roller 180 which prevents the article from toppling over. Leading edge or corner 133 of the loaf rides over the control member 121 but has no effect on the same since the latter is held in its normal raised position by the bearing member 131 of the latch member 120. As the article continues over the control members the leading edge rides onto the latch member 120 and depresses the same as shown in Fig. 11. The inclined surface of the latch member raises the leading edge of the article so that the central bottom portion of the article is elevated above the trip member 121 and the latter remains in its normal position until the rear corner 134 of the loaf is released by the support 19.

Upon such release the article drops on the trip member, being weighted down by the roller 180, and causes a positive depression of the trip member which draws the link 136 to the left and releases the control member 140 from its first or normal position by disengagement of the latch 137 from the arm 143. If, when one of the flights 31 of the forwarding conveyor is about to commence its movement over the upper or article advancing lap or run of the conveyor D, as shown in Fig. 5, the conveyors C and D are substantially in synchronization, the cam surface 151 of the primary cam 150 engages the roller 152 to limit the movement of the control member 140. The slight movement of the control member 140 to an intermediate position which does occur, while being insufficient to cause engagement of the teeth of the ratchet gear by the detent 148 of the bell crank lever (Fig. 12), is sufficient to withdraw the roller 173 from the path of the pawl 50. As continued movement of the forwarding conveyor D causes one of the flights 31 to move the loaf L off the control members 120 and 121 onto the conveyor apron 32 and toward the wrapping machine, the cam surface 159, by engagement with the roller 152, retains the control member in its intermediate position and prevents movement of the detent 148 which would arrest the infeed conveyor C. While the flight moves over the trip member 121 the latch member 120 is held depressed by means of the rod 163 and finger 177 until the flight is in position to hold the latch member depressed.

When the flight has cleared the latch member 120 the crest 161 of the secondary cam engages the roller 152 and pivots the control member 140 in a clockwise direction as viewed in Fig. 17 to reset the control mechanism.

While one of the flights is advancing the first loaf or article onto the apron 32 and toward the wrapping machine or second operating instrumentality, the infeed conveyor is forcing articles through the slicing instrumentality in a continuous abutting series and the next succeeding article is being moved over the discharge end 33 of the support member 19. If this second article is released from the discharge end 33 while the next succeeding flight is moving over that portion of its path between the lines 154 and 155, neither the loading conveyor C nor the forwarding conveyor D is arrested and the cycle is repeated. This continuous operation of both conveyors continues until either the loading conveyor forces articles through the slicing mechanism or first operating instrumentality faster or slower than the cyclic operation of the second instrumentality. Since the forwarding conveyor D moves in synchronized timed relation with the cyclic operation of the wrapping instrumentality the articles or loaves L must be received from the slicing instrumentality in timed relation with the cyclic operation of the wrapping machine. The present control system is quite flexible, however, and it is not necessary that the loaves L be discharged from the support 19 in perfect timed synchronism with the wrapping cycle of the second instrumentality in order to keep both infeed and forwarding conveyors in continuous operation. It is sufficient, as will later appear, if the loaves be discharged onto the receiving station not materially out of synchronization with the wrapping cycle.

In the event that the loading conveyor C is operating at a faster rate of speed than the forwarding conveyor D, an article or loaf L will be deposited on the control mechanism E before one of the flights 31 reaches that portion of its path between the lines 154 and 155. Accordingly, when the latch 137 releases the control member 140 the latter moves to its second position, indicated in Fig. 13, and the bell crank lever is rotated so that the detent 148 engages one of the teeth of the ratchet gear 115 to arrest the infeed conveyor C. As soon as the flight which is to forward the article enters that portion of its path indicated by the line 154, the primary cam 150 engages the roller 152 and moves the control member 140 to withdraw the detent 148 from the ratchet gear 115 and the infeed conveyor is set in operation, thus resuming the feed of articles through the first instrumentality A.

Operation of the loading conveyor C slower than the wrapping instrumentality B, so that the rate at which articles are discharged from the support member 19 is less than the cyclic period of the wrapping mechanism, causes one of the flights 31 of the forwarding conveyor to reach position 155 before an article has been deposited on the controls or trippers E. In such case, the roller 173 engages the surface 175 of the pawl 50 and releases the pawl from the dog 49 to arrest the forwarding conveyor D with the flight 31 substantially in the position indicated in Fig. 5.

The disengagement of the pawl 50 from the dog 49 stops the secondary cam 157 short of the position in which the roller 152 will be engaged by the cam surface 159 upon release of the control member 140 by the latch 137, when the next article is discharged onto the trippers E from the slicing mechanism. In this manner should an article be discharged onto the trippers shortly after the pawl 50 is disengaged, the infeed or loading conveyor C is arrested by the movement of the control member 140 from its first or normal position to its second position and the movement of the detent 148 into engagement with the ratchet wheel. Thus no additional movement of articles through the slicing instrumentality occurs until an article previously deposited on the trippers E has been carried away. This feature is important since, as previously mentioned, the conveyor D is adapted to be picked up only when in perfect synchronization with the operating cycle of the wrapping machine B. Hence, where the pawl 50 is released but a relatively short time interval before an article moves from the discharge edge 33 of the support 19 onto the trippers, both infeed conveyor C and forwarding conveyor D will remain idle until, on the next revolution of the shaft 42, the primary cam 150 engages the roller 152 so as to move the control member 140 to its intermediate position and release the detent 148 from the ratchet wheel 115, starting the infeed conveyor, and shoulder 54 of the clutch dog 49 engages the jaw 53 of the pawl 50 to start the forwarding conveyor.

If the operator notices that the loading or feeding conveyor C is being stopped quite frequently by the friction clutch H while the forwarding conveyor D remains in substantially continuous operation, he may decrease the rate of movement of the infeed conveyor C by means of the variable speed control K, the hand crank 70 being turned to decrease the effective diameter of the split pulley 60. If, on the other hand, the operator notices that the forwarding conveyor D is being stopped quite frequently by disengagement of the pawl 50 from the clutch dog 49, the rate of speed of the infeed conveyor C may be increased by actuation of the handle 70 of the variable speed mechanism K to increase the effective diameter of the split pulley 60. The optimum condition of performance is that in which the forwarding conveyor D remains in substantially continuous operation and is only stopped by the control mechanism under an abnormal condition, and the infeed or loading conveyor C is also nearly constant in operation but is momentarily stopped at infrequent intervals when the rate of discharge or articles from the slicing mechanism slightly exceeds the rate at which the articles are withdrawn therefrom by the conveyor D.

In Fig. 20 is illustrated a modification of the invention in which the endless belt infeed conveyor shown in Figs. 1, 2, and 5 is replaced by a flight infeed conveyor. This flight infeed conveyor may be constructed similarly to the flight forwarding or discharge conveyor D previously described and comprises a pair of spaced parallel endless belts or chains, one of which is indicated at 185. The ends of the side chains 185 toward the slicing knives 1, are carried over idling sprockets 186 mounted on rotatable shaft 189 carried between the side frames of the slicing machine, and underneath driving sprockets 187 secured on driving shaft 188 journalled in the side frames 4 and which corresponds to the shaft 119 previously mentioned. The ends of the side belts 185 remote from the slicing knives 1, are carried around idling sprockets, not shown, mounted similarly to the sprockets 186. Flights 190 extend between the side chains 185 and are pivoted thereto at 191 ahead of the planes of their article contacting surfaces. The flights ride over the surface of an apron 193 which is inclined downwardly toward the slicing knives 1 and supports articles being advanced into the slicing mechanism by the flights. Adjacent the end of the upper lap of the side chains 185 the flights 190 drop by gravity through a transverse slot 194 formed across the apron 193 and the article being advanced by the flight is subsequently pushed through the slicing mechanism by the succeeding articles. The shaft 188 is driven from the sprocket 116 of the clutch H by the chain 117 which actuates the sprocket 118 secured on the shaft 188.

During normal operation of the conveyor system employing a flight infeed conveyor, and provided that the flights 190 of the infeed are properly correlated or set in phase with the flights 31 of the forwarding conveyor, the movement of a fresh unsliced article into the abutting series in the slicing instrumentality will effect the discharge of a sliced article from the abutting series onto the control trippers E in proper timed relation with respect to the movement of the forwarding conveyor D to be engaged by one of the flights 31 of the latter and thence advanced to the wrapping instrumentality. One method of accomplishing this correlating or phasing of the loading and forwarding conveyors is to drive both conveyors from the same source of power. As previously described, the forwarding conveyor is driven from the main conveyor drive shaft 42, which is actuated by the chain 43 from the wrapping machine B. In the embodiment of our invention employing a flight infeed conveyor, we dispense with the variable speed control mechanism K and drive the main infeed conveyor shaft 81 by means of a chain 195 driven by a sprocket 196 secured on the continuously rotating shaft 42. The chain 195 drives the sprocket 83, previously described, secured on the infeed conveyor shaft 81.

In operating a conveyor system embodying both a flight infeed conveyor and a flight forwarding conveyor of the character shown in Fig. 20, the operator after setting the several instrumentalities in motion deposits articles to be processed in the pockets between successive flights 190 on the infeed conveyor apron 193 so that a series of articles are advanced into the first operating instrumentality. As each flight drops through the slot 194 the movement of the abutting series of articles which extends from adjacent the slot 194 to the discharge edge 33 of the support member 19 stops until the next succeeding article is advanced into the end of the series by one of the flights 190 when all of the articles in the abutting series are advanced one article width and the leading article is forced off the discharge edge 33 of the support member 19 onto the trippers E.

Since both the infeed and forwarding conveyors are driven from the same shaft, the article is usually discharged from the support 19 just in time to be engaged or picked up by one of the flights 31 of the forwarding conveyor and moved over the conveyor apron 32 toward the wrapping machine. However, where a series of abnormally small articles occurs between the infeed conveyor slot 194 and the discharge edge 33 of the support plate 19, the last article advanced into the series by one of the flights 190 may fail to move the first article in the series off the support 19 onto the trippers E. In such case the roller 173 engages the surface 175 of the pawl 50 and stops the forwarding conveyor D. The infeed or loading conveyor, however, continues in operation until the next flight thereof advances an article into the receiving end of the abutting series and moves such series a sufficient distance through the slicing mechanism to completely discharge the leading article onto the trippers E. This actuation of the trippers or controls E stops the infeed conveyor unless the primary cam 150 is in that portion of its path in which the surface 151 thereof engages the roller 152. In this latter instance the infeed or loading conveyor C will continue in operation and the pawl 50 will almost immediately thereafter be engaged by the clutch dog 49 to start the forwarding conveyor D and move the discharged article off the trippers or controls E so that the latter will be clear to receive the next article discharged from the abutting series in the slicing instrumentality Where a succession of abnormally large or wide articles occurs in the abutting series between the slot 194 of the infeed conveyor apron and the discharge edge 33 of the support member 19, the leading article will be discharged before one of the flights 31 of the forwarding conveyor D is in pick-up position. The depression of the trippers or controls E by such discharged article releases the control member 140 which moves from its first position to its second position so as to bring the detent or pawl 148 into engagement with the ratchet gear 115 of the friction clutch H, arresting the loading or infeed conveyor C. This movement of the control member 140 occurs, in such case, since the cam 150 is adjusted to engage the roller 152 and prevent stopping of the infeed conveyor only when one of the flights 31 of the forwarding conveyor is in pick-up position between the lines 154 and 155. As soon as the flight of the forwarding conveyor which is to advance the article on the trippers reaches the position indicated by the line 154, the surface 151 of the primary cam 150 engages the roller 152 to move the control member 140 to its intermediate position and withdraw the detent 148 from the ratchet wheel of the clutch H, thus starting the infeed or loading conveyor. Accordingly, the feed of the articles through the first operating instrumentality is resumed substantially simultaneously with the movement of one of the flights 31 to advance the discharged article off the trippers E onto the apron 32 and toward the second or wrapping instrumentality over the forwarding conveyor.

As previously mentioned, bearing member 131 on one of the latch levers 122, by engagement with the pad 132 on one of the trip levers 123, locks the trip member 121 in its normal position, as illustrated in Fig. 5. During normal operation and in the event that an article is not deposited on the trippers at the receiving station of the forwarding conveyor D at the time one of the flights 31 is in pick-up position, the roller 173 on the control member 140 engages the pawl 50 so as to disconnect the forwarding conveyor drive and stop the forwarding conveyor with one of the flights 31 arrested substantially in the position shown in Fig. 5. However, if, under such conditions, for some reason the forwarding conveyor drive should not be arrested, the flight would continue past the pick-up position and engage the trip member 121. Since the latter would be locked in its normal position, serious injury might result to the mechanism. In order to prevent damage of this character, a safety device is provided which automatically releases the trip member from the latch member when one of the flights passes beyond the pick-up position. This safety device or attachment comprises a lever 197, Fig. 16, which is loosely pivoted on the drive shaft 24 of the forwarding conveyor D adjacent one side of the latter. The lever is held against endwise movement on the shaft by collars 198 and is connected by a link 199 to a lever 200 secured against rotation on the latch shaft 124 by a key 201. The safety lever 197 extends upwardly through a cutaway portion 202, Fig. 2, in the inclined surface 128 of the trip member 121 so that the end thereof is normally disposed in the path of the flights.

As one of the flights moves beyond its pick-up position, indicated by the full lines of Fig. 16, it engages the end of the safety lever 197 and depresses the lever to substantially the broken line position indicated. This movement of the lever is transmitted to the lever 200 by the link 199 so that the latch shaft 124 is given a slight angular movement in a counterclockwise direction which lowers the latch member and latch levers to substantially the position indicated by the broken lines. Thus lowered, the latch levers release the trip levers so that upon continued advancement of the flight 31, the latter can ride over the trip member 121 to depress the same without injury to the mechanism. The upper end of the safety lever 197 has a surface 203 which is of sufficient length to remain in engagement with the flight 31 long enough so that the latch levers are held depressed until the flight has commenced to depress the trip member. In this manner reengagement or relocking of the trip member or levers by the latch member or levers is avoided until after the flight passes beyond the article receiving station.

With a compensating or flight adjusting device of the character contemplated by the present invention, the control of the movement of articles to and through a first operating instrumentality and from the first instrumentality to a second instrumentality operating on the articles at cyclic intervals, can be accurately accomplished. The present invention thus provides a method and apparatus for controlling the movement of articles being processed by successive operating instrumentalities so that the instrumentalities receive the articles in proper sequence and each instrumentality is able to perform its functions with increased efficiency and accuracy.

While for clearness the description and illustration of the invention has been made with reference to the handling of a series of single or individual articles, the same principles are applicable to the handling or processing of a series of pairs or groups of articles. In such case, each group or pair of articles in the series would be advanced and otherwise handled in a manner corresponding to that of the individual articles or loaves L.

Other modes of utilizing the principles of the present invention may be resorted to, change being made with respect to the particular details of construction and procedure described, numerous modifications and substitutions of parts being contemplated, it being understood that the embodiments shown in the drawings and set forth above are given for purposes of explanation and illustration.

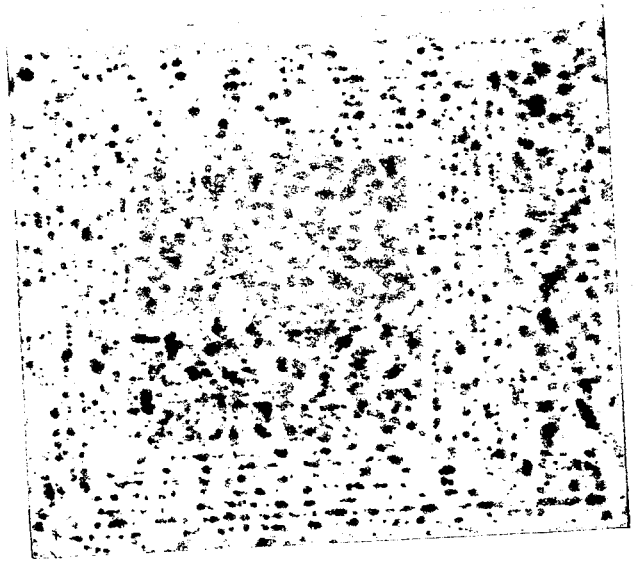

What we claim is:

1. In combination, a feed conveyor, drive means for said conveyor including a clutch structure for stopping and starting the conveyor, a conveyor having a station for receiving articles from the feed conveyor and a plurality of substantially equally spaced flights movable in succession across the station to engage received articles and forward the same away from the station, drive means for the forwarding conveyor including a member making a definite angle of rotation for each movement of the forwarding conveyor corresponding to the spacing between the flights thereof, means responsive to the movement of an article onto the receiving station for substantially immediately actuating the clutch to stop the feed conveyor, and means operative during a predetermined portion of said angle of rotation of said member to prevent said conveyor arresting actuation of the clutch.

2. In combination, a feed conveyor, drive means for said conveyor including a clutch structure for stopping and starting the conveyor, a conveyor having a station for receiving articles from the feed conveyor and a plurality of substantially equally spaced flights movable in succession across the station to engage received articles and forward the same away from the station, drive means for the forwarding conveyor including a shaft making a definite angle of rotation for each movement of the forwarding conveyor corresponding to the spacing between the flights thereof and a disengageable clutch on said shaft, the members of which are engageable only at positions angularly spaced equal to said flight space movement angle of rotation of the shaft, means normally disengaging the members of the disengageable clutch after each said definite angle of rotation of said shaft, control means responsive to the movement of an article onto the receiving station to prevent disengagement of the disengageable clutch and to normally substantially immediately actuate the feed conveyor clutch to stop the feed conveyor, and means operative during a predetermined portion of each said definite angle of rotation of the shaft to prevent said conveyor stopping actuation of the feed conveyor clutch.

3. In combination, a feed conveyor, drive means for said conveyor including a clutch structure for stopping and starting the conveyor, a conveyor having a station for receiving articles from the feed conveyor and a plurality of substantially equally spaced flights movable in succession across the station to engage received articles and forward the same away from the station, a driven shaft connected to the forwarding conveyor to drive the same and making a definite angle of rotation for each movement of the forwarding conveyor corresponding to the spacing between the flights thereof, a disengageable clutch interposed in said driving connection, the members of which are engageable only at positions corresponding to said definite angle of rotation of the driven shaft, means responsive to the movement of an article onto the receiving station for controlling the clutches independently of one another to actuate the feed conveyor clutch to stop the feed conveyor substantially immediately, and means synchronized with said shaft to prevent said conveyor stopping actuation of the infeed conveyor clutch for a portion of said angle of rotation of the shaft.

4. In combination, a feed conveyor, drive means for said conveyor including a clutch structure for stopping and starting the conveyor, a conveyor having a station for receiving articles from the feed conveyor and a plurality of substantially equally spaced flights movable in succession across the station to engage received articles and forward the same away from the station, a driven shaft connected to the forwarding conveyor to drive the same and making a definite angle of rotation for each movement of the forwarding conveyor corresponding to the spacing between the flights thereof, a disengageable clutch interposed in said driving connection, the members of which are engageable only at positions corresponding to said definite angle of rotation of the driven shaft, means normally disengaging the disengageable clutch after each rotation of the driven shaft through said definite angle of rotation, means responsive to the movement of an article onto the receiving station for normally independently actuating the feed conveyor clutch to stop the feed conveyor and for preventing disengagement of the disengageable clutch, and means synchronized with said shaft to prevent said conveyor stopping actuation of the infeed conveyor clutch for a portion of said angle of rotation of the shaft.

5. In combination, a feed conveyor, drive means for the feed conveyor including a clutch structure, a station for receiving articles from the feed conveyor, a conveyor for individually forwarding articles from the station, drive means for the forwarding conveyor, a control member movable to substantially immediately disengage the feed conveyor clutch and arrest the feed conveyor, latch means normally preventing clutch disengaging movement of the control member, and means responsive to the movement of an article onto the receiving station to actuate the latch means and release the control member.

6. In combination, a feed conveyor, drive means for the feed conveyor including a clutch structure, a station for receiving articles from the feed conveyor, a conveyor for individually forwarding articles from the station, drive means for the forwarding conveyor including a shaft making a definite angle of rotation for each article forwarded by the conveyor, a control member movable to substantially immediately disengage the feed conveyor clutch and arrest the feed conveyor, latch means normally preventing clutch disengaging movement of the control member, means responsive to the movement of an article onto the receiving station to actuate the latch means and release the control member, and means synchronized with said shaft to prevent disengagement of the clutch during a predetermined portion of said angle of rotation.

7. In combination, a feed conveyor, drive means for the feed conveyor including a clutch structure, a station for receiving articles from the feed conveyor, a conveyor for individually forwarding articles from the station, drive means for the forwarding conveyor including a clutch the members of which are engageable only at positions corresponding to an article forwarding movement of the conveyor, detent means normally disengaging the forwarding conveyor clutch after each article forwarding movement, a control member movable to substantially immediately disengage the feed conveyor clutch and to shift said detent means to avoid disengagement of the forwarding conveyor clutch, latch means normally preventing such movement of the control member, and means responsive to the movement of an article onto the receiving station to actuate the latch means and release the control member.

8. In combination, a feed conveyor, drive means for the feed conveyor including a clutch structure, a station for receiving articles from the feed conveyor, a conveyor for individually forwarding articles from the station, drive means for the forwarding conveyor including a clutch the members of which are engageable only at positions corresponding to an article forwarding movement of the conveyor, detent means normally disengaging the forwarding conveyor clutch after each article forwarding movement, a control member movable to substantially immediately disengage the feed conveyor clutch and to shift said detent means to avoid disengagement of the forwarding conveyor clutch, latch means normally preventing such movement of the control member, and means synchronized with the forwarding conveyor to prevent disengagement of the feed conveyor clutch during the forwarding of an article from the receiving station.

9. In combination, a feed conveyor, drive means for the feed conveyor including a clutch structure, a station for receiving articles from the feed conveyor, a conveyor for individually forwarding articles from the station, drive means for the forwarding conveyor including a clutch the members of which are engageable only at positions corresponding to an article forwarding movement of the conveyor, detent means normally disengaging the forwarding conveyor clutch after each article forwarding movement, a control member movable to substantially immediately disengage the feed conveyor clutch and to shift said detent means to avoid disengagement of the forwarding conveyor clutch, latch means normally preventing such movement of the control member, means responsive to the movement of an article onto the receiving station to actuate the latch means and release the control member, and means synchronized with the forwarding conveyor to reengage the latch and control member after each forwarding movement of the forwarding conveyor.

10. In a conveyor system, a feed conveyor and a drive therefor including a clutch, a forwarding conveyor having a station for receiving articles advanced thereto by the feed conveyor, a drive for the forwarding conveyor including a driven shaft, a control member movable to disengage the clutch and responsive to the movement of an article onto the receiving station to substantially immediately effect such disengagement, a disconnectable clutch on the shaft for effecting a driving connection between the shaft and the forwarding conveyor, said last named clutch having members engageable only at a single relative rotational position, means synchronized with one member of the disconnectable clutch to prevent clutch disengaging movement of the control member for a portion of each revolution of such clutch member, and means synchronized with the other member of the disconnectable clutch to prevent clutch disengaging movement of the control member for a portion of each revolution of the second named clutch member.

11. In a conveyor system, a feed conveyor and a drive therefor including a clutch, a forwarding conveyor having a station for receiving articles advanced thereto by the feed conveyor, a drive for the forwarding conveyor including a driven shaft, and a disconnectable clutch the members of which are engageable only at a single relative rotational position, a control member movable from a first position to a second position to disengage the feed conveyor clutch and arranged when in said first position to disengage the forwarding conveyor clutch, latch means normally retaining the control member in said first position, means responsive to the movement of an article onto the receiving station for actuating the latch means to release the control member for movement to said second position, and a rotatable member secured on said shaft and arranged to prevent movement of the control member to said second position while permitting sufficient movement thereof away from said first position to avoid disengagement of the forwarding conveyor clutch during a portion of each rotation of the shaft.

12. In a conveyor system, a feed conveyor and a drive therefor including a clutch, a forwarding conveyor having a station for receiving articles advanced thereto by the feed conveyor, a drive for the forwarding conveyor including a driven shaft, and a disconnectable clutch the members of which are engageable only at a single relative rotational position, a control member movable from a first position to a second position to disengage the feed conveyor clutch and arranged when in said first position to disengage the forwarding conveyor clutch, latch means normally retaining the control member in said first position, means responsive to the movement of an article onto the receiving station for actuating the latch means to release the control member for movement to said second position, means synchronized with one member of the disconnectable clutch for preventing movement of the control member to said second position during a portion of each revolution of said clutch member, and means synchronized with said shaft for preventing movement of the control member to said second position during a portion of each revolution of said shaft.

13. In a conveyor system, a feed conveyor and a drive therefor including a clutch, a forwarding conveyor having a station for receiving articles advanced thereto by the feed conveyor, a drive for the forwarding conveyor including a driven shaft, and a disconnectable clutch the members of which are engageable only at a single relative rotational position, a control member movable from a first position to a second position to disengage the feed conveyor clutch and arranged when in said first position to disengage the forwarding conveyor clutch, latch means normally retaining the control member in said first position, means responsive to the movement of an article onto the receiving station for actuating the latch means to release the control member for movement to said second position, means synchronized with one member of the disconnectable clutch for preventing movement of the control member to said second position during a portion of each revolution of said clutch member, means synchronized with said shaft for preventing movement of the control member to said second position during a portion of each revolution of said shaft, and means synchronized with said last named clutch member to move the control member to said first position after each release thereof, to be reengaged by said latch.

14. A conveyor system for a pair of instrumentalities which operate on articles in succession, the second of which functions cyclically, comprising a feed conveyor for advancing articles through the first instrumentality in an abutting series, drive means for the feed conveyor including a clutch structure, a conveyor having a station for receiving articles discharged from said abutting series of articles in the first instrumentality, means for driving the last named conveyor to forward articles from the receiving station and periodically deliver the same to the second instrumentality in synchronism with the cycle of the latter and including a clutch the members of which are engageable only in positions corresponding to the movement of the forwarding conveyor during a delivery period, a control member normally disposed in a first position to disengage the forwarding conveyor clutch after each article delivery, said member being movable to a second position to disengage the feed conveyor clutch and said movement thereof avoiding disengagement of the forwarding conveyor clutch, latch means normally retaining the control member in said first position, means responsive to the discharge of an article onto the receiving station to actuate the latch means and release the control member, and means synchronized with the second instrumentality to prevent disengagement of the feed conveyor clutch during a portion of each cycle.

15. A conveyor system for advancing articles to a first instrumentality, for performing a substantially continuous operation on the articles, and for forwarding the articles from the first instrumentality to a second instrumentality for cylically performing a subsequent operation on the articles, comprising a feed conveyor for advancing articles to said first instrumentality, a conveyor having an article receiving station, for receiving articles from the first instrumentality and forwarding the received articles to said second instrumentality in timed relation to the cyclic operation thereof, drive means for actuating the feed conveyor, control means for starting and stopping said drive means, drive means for actuating the forwarding conveyor in synchronism with the cyclic operations of said second instrumentality and including a disconnectable clutch, said clutch being adapted to engage and actuate the forwarding conveyor only in synchronism with the cyclic operation of said second instrumentality, means responsive to the movement of articles moving from said first instrumentality onto said station to substantially immediately actuate said control means to stop the feed conveyor, and means synchronized with said forwarding conveyor to prevent actuation of the feed conveyor control means during the movement of an article by the forwarding conveyor away from said receiving station.

16. A conveyor system for advancing articles to a first instrumentality and for forwarding the articles from the first instrumentality to a second instrumentality, comprising an endless belt feed conveyor for advancing articles to the first instrumentality, a flight conveyor for receiving articles from the first instrumentality and forwarding received articles to the second instrumentality, drive means for actuating the forwarding conveyor in timed relation with the second instrumentality, drive means for the feed conveyor separate from the drive means for the forwarding conveyor, clutch means for controlling the movement of the feed conveyor, clutch means for controlling the movement of the forwarding conveyor, control means responsive to the movement of articles onto the forwarding conveyor from the first instrumentality to actuate the feed clutch to stop the feed conveyor and means synchronized with the forwarding conveyor to prevent said stopping of the feed conveyor upon the movement of an article onto the forwarding conveyor from the first instrumentality when a flight of the forwarding conveyor is in position to pick up such article and advance it to the second instrumentality.

17. In combination, a loading conveyor, a forwarding conveyor having spaced flights for receiving articles from the loading conveyor and advancing the same at cyclic intervals, clutch means controlling the movement of the loading conveyor, means synchronized with the movement of the forwarding conveyor including a member making one revolution for each movement of the forwarding conveyor equal to one flight space, means responsive to the movement of an article onto the forwarding conveyor from the loading conveyor to automatically and substantially immediately disengage said clutch, and a member actuated by said rotatable member during a portion of each revolution thereof to prevent said disengagement of the feed conveyor clutch.

18. In combination, a feed conveyor, a forwarding conveyor having a plurality of spaced flights and a station at one end thereof for receiving articles from the feed conveyor, drive means for the conveyors including a clutch structure for controlling the movement of the feed conveyor, means responsive to the movement of an article onto the receiving station of the forwarding conveyor to substantially immediately actuate the clutch and stop the feed conveyor, and means for making the article responsive means ineffective to stop the feed conveyor during the movement of each flight of the forwarding conveyor across the article receiving station.

19. The method of advancing articles to and through a first operating instrumentality and from the first instrumentality to a second instrumentality operating cyclically on the articles, which comprises feeding a continuous succession of articles into the first instrumentality, moving the fed articles through the first instrumentality in an abutting series, discharging the articles from the first instrumentality at substantially uniform time intervals, forwarding each discharged article to the second instrumentality in synchronism with the cyclic operation thereof and prior to the discharge of the next succeeding article in the abutting series, substantially immediately arresting the feeding in response to the discharge of an article materially out of synchronism with the cyclic forwarding of the previous article, arresting the forwarding of an article upon the failure of the next succeeding article to be discharged from the abutting series in substantial synchronism with the cyclic forwarding of the previously discharged article and resuming the forwarding only in synchronism with the cyclic operation of the second instrumentality, and positively feeding the articles into the first instrumentality during the commencement of each forwarding of a discharged article without regard to synchronism between the feeding and forwarding.

20. In a conveyor system for advancing a succession of articles, drive means including a clutch, and a pair of co-acting trips for controlling the clutch, said trips being disposed adjacent the path of articles passing over the system to be engaged and actuated by the articles, one of the trips being held by the other against actuation by the articles until said other trip is actuated by one of the articles.

21. In a conveyor system for advancing a succession of articles, drive means including a clutch, and a pair of co-acting trips for controlling the clutch, said trips being mounted for pivotal movement about substantially parallel axes and disposed adjacent the path of articles passing over the system to be engaged and actuated by the articles, one of the trips being held by the other against actuation by the articles until said other trip is actuated by one of the articles.

22. In a conveyor system for advancing a succession of articles, drive means including a clutch, and a pair of co-acting trips for controlling the clutch, said trips being disposed adjacent the path of articles passing over the system to be successively engaged and actuated by the articles, the trip first engaged being held by the other against actuation by the articles until said other trip is actuated.

23. In a conveyor system for advancing a succession of articles, drive means including a clutch, and a pair of co-acting trips for controlling the clutch, said trips being disposed under the article path so that advancing articles pass thereover to depress and actuate the same and are supported thereby, one of the trips being held by the other against actuation by the articles until said other trip is actuated.

24. In a conveyor for advancing a succession of articles, drive means including a clutch, and a pair of co-acting trips for controlling the clutch, said trips being disposed under the article path so that advancing articles pass thereover in succession to depress and actuate the same and are supported thereby, the trip first passed over being held by the other against actuation by the articles until said other trip is actuated.

25. In a conveyor system for advancing a succession of articles, drive means including a clutch, and a pair of co-acting trips for controlling the clutch, said trips being disposed under the article path and mounted for pivotal movement about substantially parallel horizontal axes so that advancing articles pass thereover to depress and actuate the same and are supported thereby, one of the trips being held by the other against pivotal movement by an article supported thereon until said other trip is depressed.

26. In a conveyor system for advancing a succession of articles, drive means including a clutch, control means for the clutch comprising a pivoted arm, a trip member on the arm and supported adjacent the path of articles passing over the system to be engaged and actuated by the articles, and a latch member supported adjacent said path to be engaged and actuated by the articles, said latch member normally being interlocked with the trip member to prevent actuation of the latter until the latch member is actuated.

27. In a conveyor system for advancing a succession of articles, drive means including a clutch, control means for the clutch comprising a pivoted arm, a trip member on the arm and supported adjacent the path of articles passing over the system to be engaged and actuated by the articles, and a latch member supported adjacent said path beyond the trip in the direction of article movement over said path to be engaged and actuated by the articles, said latch member normally being interlocked with the trip member to prevent actuation of the latter until the latch member is actuated.

28. In a conveyor system for advancing a succession of articles, drive means including a clutch, control means for the clutch comprising a trip supported for pivotal movement about a substantially horizontal axis and disposed across the path of articles being advanced to support the same and be depressed thereby, and a latch supported adjacent the path to be actuated by the advancing articles, said latch being formed to normally support the trip and prevent depression thereof by the weight of an article supported thereon until the latch is actuated.

29. In a conveyor system for moving a succession of articles, a feed conveyor and a drive therefor including a clutch, a forwarding conveyor having a station for receiving articles advanced thereto by the feed conveyor, and control means at the receiving station for actuating the clutch, said means being primarily responsive to the rear edge of an advancing article to actuate the clutch to stop the feed conveyor.

30. In a conveyor system for moving a succession of articles, a feed conveyor and a drive therefor including a clutch, a forwarding conveyor having a station for receiving articles advanced thereto by the feed conveyor, and control means at the receiving station for actuating the clutch including a trip actuable by an advancing article and a latch actuable by an advancing article, said trip and latch being connected so that the latch prevents actuation of the trip until the latch is actuated, and the latch being disposed beyond the trip in the direction of article movement.

31. In a conveyor system for moving a succession of articles, a feed conveyor and a drive therefor including a clutch, a forwarding conveyor having a station for receiving articles advanced thereto by the feed conveyor, a resiliently supported depressable trip at said station over which advancing articles pass, connections between the clutch and trip to actuate the clutch and stop the feed conveyor upon depression of the trip, and a resiliently supported depressable latch disposed beneath the path of the articles moving beyond the trip, said latch normally locking the trip to support the same against clutch actuating depression and being movable from locking position by an advancing article to release the trip to actuate the clutch to stop the feed conveyor under the influence of an article on the trip.

32. In a conveyor system for advancing a succession of articles, a feed conveyor and a drive therefor including a clutch, a forwarding conveyor having a station for receiving articles from the feed conveyor, a support for articles moving from the feed conveyor to the receiving station and having a discharge edge adjacent the latter, a trip disposed at the station and adjacent said support edge, said trip being actuable by an article moving there-past and having connection with the clutch to actuate the same to stop the feed conveyor upon such actuation of the trip, and means for locking the trip against said actuation until the leading side of the article moves beyond the trip.

33. In a conveyor system for advancing a succession of articles, a feed conveyor and a drive therefor including a clutch, a forwarding conveyor having a station for receiving articles from the feed conveyor, a support for articles moving from the feed conveyor to the receiving station and having a discharge edge adjacent the latter, and a pair of trips disposed at the station and adjacent said support edge and actuable by advancing articles, one trip being connected to the clutch to actuate the same and stop the feed conveyor, the other trip being disposed beyond said one trip from the discharge edge to cooperate with the support in supporting an article to prevent actuation of said one trip by the article until the article is moved beyond said support edge, and means associated with said other trip to lock said one trip against actuation by an article prior to actuation of said other trip.

34. In a conveyor system for advancing a succession of articles, a feed conveyor and a drive therefor including a clutch, a forwarding conveyor having a station for receiving articles from the feed conveyor, a support for articles moving from the feed conveyor to the receiving station and having a discharge edge adjacent the latter, and a pair of trips disposed at the station and adjacent said support edge and actuable by advancing articles, said trips being mounted on pivots spaced in the direction of article advancement and each being further from its own pivot than the other trip is, one trip being further from said edge than the other and having connections for actuating the clutch to stop the feed conveyor and the other trip having means connecting with the further trip to prevent actuation of the latter, said actuation preventing means being arranged to release the further trip upon actuation of the other trip.

35. In a conveyor system, a conveyor having a receiving station and spaced flights which move over the station to engage articles received at the station and advance the articles away from the station, a drive for the conveyor including a clutch having control means normally actuating the same to interrupt the drive and stop the conveyor prior to the movement of a flight over the station, a trip in the path of the flights and movable to allow the flights to pass, said trip being actuable by an article at the station and having means associated therewith to prevent said conveyor stopping actuation of the clutch when the trip is actuated by an article at the station, and latch means for holding the trip against movement and being actuable by an article at the station to release the latch.

36. In a conveyor system, a conveyor having a receiving station and spaced flights which move over the station to engage articles received at the station and advance the articles away from the station, a drive for the conveyor including a clutch having control means normally actuating the same to interrupt the drive and stop the conveyor prior to the movement of a flight over the station, a trip in the path of the flights and movable to allow the flights to pass, said trip being actuable by an article at the station and having means associated therewith to prevent said conveyor stopping actuation of the clutch when the trip is actuated by an article at the station, latch means for holding the trip against movement and being actuable by an article at the station to release the latch, and means actuable by a flight moving over the station to free the trip from the latch in the absence of an article at the station to allow such flight to pass the trip.

37. In a conveyor system, a conveyor having a receiving station and spaced flights which move over the station to engage articles received at the station and advance the articles away from the station, a drive for the conveyor including a clutch having control means normally actuating the same to interrupt the drive and stop the conveyor prior to the movement of a flight over the station, a trip in the path of the flights and movable to allow the flights to pass, said trip being actuable by an article at the station and having means associated therewith to prevent said conveyor stopping actuation of the clutch when the trip is actuated by an article at the station, latch means for holding the trip against movement and being actuable by an article at the station to release the latch, and means actuable by the conveyor to free the trip from the latch in the absence of an article at the station.

38. In a conveyor system having a flight conveyor and drive means therefor including a clutch, a trip for controlling the clutch and disposed in the path of the flights of the conveyor and actuable by an article on the conveyor, a latch for normally holding the trip against actuation and being actuable by an article to release the trip, and means actuable by the conveyor to free the trip from the latch in the absence of an article.

39. In combination with a conveyor having an article receiving station and drive means including a clutch, a trip depressable by an article at said station, a control member responsive to the trip for governing the clutch, and means connected to the control member for holding the trip depressed.

40. In combination with a conveyor having an article receiving station and drive means including a clutch, a trip depressable by an article at said station, a latch for supporting the trip, said latch being depressable by an article at the station to release the trip, a control member responsive to the trip for governing the clutch, means connected to the control member for holding the trip depressed, and a connection between the trip and the latch to hold the latter depressed with the trip.

41. In a conveyor system, a feed conveyor and a drive therefor including a clutch structure, a forwarding conveyor having a station for receiving articles from the feed conveyor and means movable across the station at intervals to engage received articles and forward the same, drive means for the forwarding conveyor including a rotatable member making a definite angle of rotation for each article forwarding movement of the article engaging means across the station, a control member movable in response to the movement of an article to the station and having connection with the clutch to thereby start and to stop the feed conveyor drive, and means synchronized with the rotatable member for moving the control member to actuate the clutch and start the feed conveyor drive during each said definite angle of rotation.

42. In a conveyor system, a feed conveyor and a drive therefor including a clutch structure, a forwarding conveyor having a station for receiving articles from the feed conveyor and means movable across the station at intervals to engage received articles and forward the same, drive means for the forwarding conveyor including a clutch having a rotatable member making a definite angle of rotation for each article forwarding movement of the article engaging means across the station, a control member having connection with the forwarding conveyor clutch to normally disengage the same after each said definite angle of rotation of the rotatable member to stop the forwarding conveyor just prior to said movement of the article engaging means, said control member being movable in response to the movement of an article to the station to avoid disengagement of the forwarding conveyor clutch and having connection with the feed conveyor clutch to start and to stop the feed conveyor drive, and means synchronized with the rotatable member for moving the control member to actuate the feed conveyor clutch and start the feed conveyor drive during each said definite angle of rotation.

43. In a conveyor system, a feed conveyor and a drive therefor including a clutch structure, a forwarding conveyor having a station for receiving articles from the feed conveyor and means movable across the station at intervals to engage received articles and forward the same, drive means for the forwarding conveyor including a clutch having a rotatable member making a definite angle of rotation for each article forwarding movement of the article engaging means across the station, a control member having connection with the forwarding conveyor clutch to normally disengage the same after each said definite angle of rotation of the rotatable member to stop the forwarding conveyor just prior to said movement of the article engaging means, said control member being movable in response to the movement of an article to the station to avoid disengagement of the forwarding conveyor clutch and having connection with the feed conveyor clutch to start and to stop the feed conveyor drive, and a rotatable element and means mounting the same synchronized with the rotatable member to actuate the feed conveyor clutch and start the feed conveyor drive during each said definite angle of rotation, said element being shiftable on the mounting means to vary the position of the same with respect to the clutch rotatable member and alter the relative time of the start of the feed conveyor.

44. In a conveyor system for advancing a succession of articles, a conveyor having drive means including a clutch, a control member having connection with the clutch to actuate the same for starting and stopping the conveyor, a depressible trip disposed adjacent the path of articles moving over the system, said control member being movable in response to depression of the trip by an article, and a resilient connection between the control member and the trip to normally yieldingly hold the latter in elevated position and allow limited movement of the same without movement of the control member.

45. In a conveyor system for advancing a succession of articles, a conveyor having drive means including a clutch, a control member having connection with the clutch to actuate the same for starting and stopping the conveyor, a depressible trip disposed adjacent the path of articles moving over the system, a latch for holding the control member in one position and having connection with the trip to be actuated upon depression of the trip to release the control member for clutch actuating movement, and a resilient connection between the control member and the trip to normally yieldingly hold the latter in elevated position when the control member is held by the latch and allow limited movement of the trip without movement of the control member.

46. In a conveyor system for advancing a succession of articles, a conveyor having drive means including a clutch, a control member having connection with the clutch to actuate the same for starting and stopping the conveyor, a depressable trip disposed adjacent the path of articles moving over the system, a latch for holding the control member in one position and having connection with the trip to be actuated upon depression of the trip to release the control member for clutch actuating movement, a relatively weak resilient connection between the control member and the trip to normally yieldingly hold the latter in elevated position when the control member is held by the latch, driven resetting means having connection with the control member for moving the same after each clutch actuating movement to said held position, and a relatively strong resilient connection between the control member and the trip to move the latter to said elevated position upon each movement of the control member by the resetting means.

47. In a conveyor system for advancing a succession of articles, a conveyor having drive means including a clutch, a control member having connection with the clutch to actuate the same for starting and stopping the conveyor, a depressable trip disposed adjacent the path of articles moving over the system, a latch member for locking the trip in elevated position against depression and disposed adjacent the article path to be engaged by an article and moved to release the trip, said control member being movable in response to depression of the trip by an article to actuate the clutch, and driven resetting means for raising the trip to elevated position after each said actuation of the clutch.

48. In a conveyor system, a conveyor having a receiving station and means movable over the station at intervals to engage and forward articles, a drive for the conveyor including a clutch, a control member and latch means holding the same in position for connection with the clutch to normally actuate the same to stop the conveyor prior to each movement of the article engaging means over the station, an article engaging trip at the station having connection with the latch means to release the control member in response to the pressure of an article at the station so that the control member fails to actuate the clutch to stop the conveyor, and a connection between the control member and the trip to withdraw the latter from the path of the aricle engaging means when the control member is released.

49. In a conveyor system, a conveyor having a receiving station and means movable over the station at intervals to engage and forward articles, a drive for the conveyor including a clutch, a control member and latch means holding the same in position for connection with the clutch to normally actuate the same to stop the conveyor prior to each movement of the article engaging means over the station, an article engaging trip at the station having connection with the latch means to release the control member in response to the pressure of an article at the station so that the control member fails to actuate the clutch to stop the conveyor, a latch member for locking the trip in article engaging position and responsive to the movement of an article to said station to release the trip, and a connection between the control member and the trip and the latch member to withdraw the trip and the latch member from the path of the article engaging means when the control member is released.

50. In a conveyor system for moving a succession of articles, a feed conveyor having means engageable with the rear sides of successive articles to individually advance the same in spaced apart relation, a forwarding conveyor having a receiving station and means movable over the station at intervals to individually engage the rear sides of the articles and forward the same in spaced apart relation, drive means for the conveyors including a clutch for stopping and starting the feed conveyor, a control member and means connecting the same to the clutch, article responsive means at the station having connection with the control member for movement of the latter to actuate the clutch and stop the feed conveyor upon movement of an article to said station, and means synchronized with said article engaging means of the forwarding conveyor to move the control member to actuate the clutch to start the feed conveyor prior to the movement of the article engaging means of the forwarding conveyor over the station.

51. In a conveyor system for moving a succession of articles, a feed conveyor having means engageable with the rear sides of successive articles to individually advance the same in spaced apart relation, a forwarding conveyor having a receiving station and means movable over the station at intervals to individually engage the rear sides of the articles and forward the same in spaced apart relation, drive means for the conveyors including a clutch for stopping and starting the feed conveyor, a control member and means connecting the same to the clutch, article responsive means at the station having connection with the control member for movement of the latter to actuate the clutch and stop the feed conveyor upon movement of an article to said station, means synchronized with said article engaging means of the forwarding conveyor to move the control member to actuate the clutch to start the feed conveyor prior to the movement of the article engaging means of the forwarding conveyor over the station, and other means synchronized with said forwarding conveyor to have connection with the control member after commencement of said movement of the article engaging means of the forwarding conveyor over the station to prevent said conveyor stopping clutch actuating movement of the control member while such article engaging means is moving over the station.

52. In a conveyor system, a feed conveyor having spaced flights for individually advancing articles, a forwarding conveyor having a station for receiving articles from the feed conveyor and spaced flights movable over the station to individually engage and advance articles received thereon, drive means including a shaft making a definite angle of rotation for each movement of the forwarding conveyor corresponding to the spacing between the flights thereof, a driving connection between the feed conveyor and said shaft including a clutch, a driving connection between the forwarding conveyor and said shaft including a clutch, a control member normally disposed to make connection with the forwarding conveyor clutch to actuate the same and stop the forwarding conveyor, a trip adjacent the station to be engaged and actuated by an article at the station, said trip having connection with the control member so that upon said actuation of the trip the control member moves to avoid actuation of the forwarding conveyor clutch, and a connection between the control member and the feed conveyor clutch to actuate the latter to stop the feed conveyor upon said movement of the control member.

53. In a conveyor system, a feed conveyor having spaced flights for individually advancing articles, a forwarding conveyor having a station for receiving articles from the feed conveyor and spaced flights movable over the station to individually engage and advance articles received thereon, drive means including a shaft making a definite angle of rotation for each movement of the forwarding conveyor corresponding to the spacing between the flights thereof, a driving connection between the feed conveyor and said shaft including a clutch, a driving connection between the forwarding conveyor and said shaft including a clutch, a control member normally disposed to make connection with the forwarding conveyor clutch to actuate the same and stop the forwarding conveyor, a trip adjacent the station to be engaged and actuated by an article at the station, said trip having connection with the control member so that upon said actuation of the trip the control member moves to avoid actuation of the forwarding conveyor clutch, a connection between the control member and the feed conveyor clutch to actuate the latter to stop the feed conveyor upon said movement of the control member, and means synchronized with the forwarding conveyor to hold the control member against said feed conveyor stopping clutch actuating movement during the movement of the forwarding conveyor flights across the receiving station.

54. In a conveyor system, a feed conveyor having spaced flights for individually advancing articles, a forwarding conveyor having a station for receiving articles from the feed conveyor and spaced flights movable over the station to individually engage and advance articles received thereon, drive means including a shaft making a definite angle of rotation for each movement of the forwarding conveyor corresponding to the spacing between the flights thereof, a driving connection between the feed conveyor and said shaft including a clutch, a driving connection between the forwarding conveyor and said shaft including a clutch the members of which are engageable only at positions angularly spaced equal to said flight space movement angle of rotation of the shaft, a control member normally disposed to make connection with the forwarding conveyor clutch to disengage the members thereof and stop the forwarding conveyor just prior to the movement of a flight thereof across the station, a trip disposed to be engaged and actuated by an article at the station and having connection with the control member so that upon actuation of the trip the control member moves to avoid disengaging the clutch members, and a connection between the control member and the feed conveyor clutch to actuate the latter to stop the feed conveyor upon said movement of the control member.

55. In a conveyor system, a feed conveyor having spaced flights for individually advancing articles, a forwarding conveyor having a station for receiving articles from the feed conveyor and spaced flights movable over the station to individually engage and advance articles received thereon, drive means including a shaft making a definite angle of rotation for each movement of the forwarding conveyor corresponding to the spacing between the flights thereof, a driving connection between the feed conveyor and said shaft including a clutch, a driving connection between the forwarding conveyor and said shaft including a clutch the members of which are engageable only at positions angularly spaced equal to said flight space movement angle of rotation of the shaft, a control member normally disposed to make connection with the forwarding conveyor clutch to disengage the members thereof and stop the forwarding conveyor just prior to the movement of a flight thereof across the station, a trip disposed to be engaged and actuated by an article at the station and having connection with the control member so that upon actuation of the trip the control member moves to avoid disengaging the clutch members, a connection between the control member and the feed conveyor clutch to actuate the latter to stop the feed conveyor upon said movement of the control member, and means synchronized with said shaft to hold the control member against said feed conveyor stopping clutch actuating movement for a predetermined interval of forwarding conveyor movement prior to the normal stopping position of the latter.

56. In a conveyor system, a feed conveyor and drive means therefor including a clutch, a forwarding conveyor having a station for receiving articles from the feed conveyor and means movable over the station at periodic intervals to individually engage and cyclically advance articles, drive means for the forwarding conveyor including a shaft making a definite angle of rotation for each movement of said article engaging means over the station and a clutch on the shaft, the members of which are engageable only at positions angularly spaced equal to said angle of rotation, a control member and latch means holding the same to normally have connection with the forwarding conveyor clutch to disengage the same and stop the forwarding conveyor just prior to the movement of the article engaging means over the station, a trip actuable by an article at the station and having connection with the latch to actuate the latter and release the control member for primary movement to avoid disengaging the forwarding conveyor clutch, and means connecting the feed conveyor clutch to the released control member so that secondary movement of the latter normally actuates such clutch substantially immediately upon said secondary movement of the control member to thereby quickly stop the feed conveyor in response to the movement of an article to said station.

57. In a conveyor system, a feed conveyor and drive means therefor including a clutch, a forwarding conveyor having a station for receiving articles from the feed conveyor and means movable over the station at periodic intervals to individually engage and cyclically advance articles, drive means for the forwarding conveyor including a shaft making a definite angle of rotation for each movement of said article engaging means over the station and a clutch on the shaft, the members of which are engageable only at positions angularly spaced equal to said angle of rotation, a control member and latch means holding the same to normally have connection with the forwarding conveyor clutch to disengage the same and stop the forwarding conveyor just prior to the movement of the article engaging means over the station, a trip actuable by an article at the station and having connection with the latch to actuate the latter and release the control member for primary movement to avoid disengaging the forwarding conveyor clutch, means connecting the feed conveyor clutch to the released control member so that secondary movement of the latter normally actuates such clutch substantially immediately upon said secondary movement of the control member to thereby quickly stop the feed conveyor in response to the movement of an article to said station, and driven means synchronized with one member of the forwarding conveyor clutch and having connection with the control member during the movement of the article engaging means across the station, to prevent said secondary movement of the control member while permitting said primary movement of the control member to keep both conveyors in operation during such movement of the article engaging means.

58. In a conveyor system, a feed conveyor and drive means therefor including a clutch, a forwarding conveyor having a station for receiving articles from the feed conveyor and means movable over the station at periodic intervals to individually engage and cyclically advance articles, drive means for the forwarding conveyor including a shaft making a definite angle of rotation for each movement of said article engaging means over the station and a clutch on the shaft, the members of which are engageable only at positions angularly spaced equal to said angle of rotation, a control member and latch means holding the same to normally have connection with the forwarding conveyor clutch to disengage the same and stop the forwarding conveyor just prior to the movement of the article engaging means over the station, a trip actuable by an article at the station and having connection with the latch to actuate the latter and release the control member for primary movement to avoid disengaging the forwarding conveyor clutch, means connecting the feed conveyor clutch to the released control member so that secondary movement of the latter normally actuates such clutch substantially immediately upon said secondary movement of the control member to thereby quickly stop the feed conveyor in response to the movement of an article to said station, driven means synchronized with one member of the forwarding conveyor clutch and having connection with the control member during the movement of the article engaging means across the station to prevent said secondary movement of the control member while permitting said primary movement of the control member to keep both conveyors in operation during such movement of the article engaging means, and driven means synchronized with the other member of the forwarding conveyor clutch and having connection with the control member for a predetermined interval prior to the movement of the article engaging means across the station to prevent said secondary movement of the control member and keep the feed conveyor in operation during said predetermined interval.

59. In a conveyor system, a feed conveyor and drive means therefor including a clutch, a forwarding conveyor having a station for receiving articles from the feed conveyor and means movable over the station at periodic intervals to individually engage and cyclically advance articles, drive means for the forwarding conveyor including a shaft making a definite angle of rotation for each movement of said article engaging means over the station and a clutch on the shaft, the members of which are engageable only at positions angularly spaced equal to said angle of rotation, a control member movable in response to the delivery of an article to the receiving station and having connection with the feed conveyor clutch to actuate the same to stop such conveyor, means for disengaging the members of the forwarding conveyor clutch, means synchronized with one member of the forwarding conveyor clutch and having connection with the control member to prevent said infeed conveyor clutch actuating movement of the same for part of each cycle, and means synchronized with the other member of the forwarding conveyor clutch and having connection with the control member to prevent said infeed conveyor clutch actuating movement of the same for another part of the cycle.

60. In combination, a feed conveyor, a forwarding conveyor for receiving articles from the feed conveyor and advancing the received articles in spaced apart relation, drive means for the feed conveyor including a first clutch structure, drive means for the forwarding conveyor including a constantly rotating shaft and a second clutch structure adapted to make connection with said shaft at only a single point in the rotation of the latter, control means responsive to the movement of an article to the forwarding conveyor from the feed conveyor to normally disengage the first clutch and stop the feed conveyor, a member arranged to normally disengage the second clutch at a predetermined point in each revolution of the shaft, said control means being arranged to prevent said disengagement of the second clutch upon the movement of an article to the forwarding conveyor, and means synchronized with said shaft to prevent said disengagement of the first clutch during a portion of each revolution of the shaft.

WILLIAM C. PALMER.
HAROLD H. MOHL.